(12) United States Patent
Lopez-Santillana

(10) Patent No.: US 8,879,286 B2
(45) Date of Patent: Nov. 4, 2014

(54) FACILITY POWER SUPPLY WITH POWER-FACTOR CORRECTION

(75) Inventor: Juan-Luis Lopez-Santillana, Shoreline, WA (US)

(73) Assignee: STS, Inc., Shoreline, WA (US)

( * ) Notice: Subject to any disclaimer, the term of this patent is extended or adjusted under 35 U.S.C. 154(b) by 445 days.

(21) Appl. No.: 13/194,707

(22) Filed: Jul. 29, 2011

(65) Prior Publication Data

US 2012/0026768 A1    Feb. 2, 2012

Related U.S. Application Data

(60) Provisional application No. 61/368,771, filed on Jul. 29, 2010.

(51) Int. Cl.
*H02M 7/10* (2006.01)
*H02M 1/42* (2007.01)

(52) U.S. Cl.
CPC ............ *H02M 1/4225* (2013.01); *Y02B 70/126* (2013.01); *H02M 1/4216* (2013.01)
USPC .............................. 363/68; 363/89

(58) Field of Classification Search
USPC ............ 363/16–20, 21.08, 34–46, 49, 56.01, 363/71–72, 126, 127, 132; 323/205, 207, 323/212, 222.272, 273, 282–285, 288; 397/11, 64, 87, 82, 112, 125, 120, 66, 397/86
See application file for complete search history.

(56) References Cited

U.S. PATENT DOCUMENTS 3,089,074 A    5/1963    Vaughan
4,509,108 A    4/1985    Gallios (Continued)

FOREIGN PATENT DOCUMENTS

KR    20090099388    9/2009

OTHER PUBLICATIONS

John G. Nairus, "Three-Phase Boost Active Power Factor Correction For Diode Rectifiers", Aero Propulsion and Power Directorate Wright Laboratory Air Force Materiel Command Wright Patterson Air Force Base, Ohio 45433-7251, Feb. 1996, pp. 70.

(Continued)

*Primary Examiner* — Rajnikant Patel
(74) *Attorney, Agent, or Firm* — Graybeal Jackson LLP; Bryan A. Santarelli

(57) ABSTRACT

An embodiment of a power supply includes an input node, a converter stage, and an outlet. The input node is operable to receive an input AC signal having peak portions and non-peak portions. The converter stage is operable to generate a DC power signal from the input AC signal and to cause a first current to be drawn from the input node during at least the non-peak portions of the input AC signal. And the outlet is operable to carry the DC power signal. For example, such a power supply may be installed in a facility such as a residence, office building, or manufacturing plant, or the facility's existing power supply may be retrofitted, to provide one or more power outlets that each carry a respective power-factor-corrected (PFC) DC voltage. Because the outlet voltages are PFC voltages, the amount of wasted power dissipated in the facility power lines/wiring and in the main power lines from the power company may be significantly reduced, without requiring each piece of equipment (e.g., an appliance, machinery) that is wired/plugged into the outlets to have an onboard PFC. This savings in wasted power may provide a significant cost savings to both the facility owner (e.g., lower electric bill) and the power company (e.g., lower power-generation and grid costs), and the ability to use equipment lacking onboard PFCs may reduce the purchase price of the equipment.

67 Claims, 12 Drawing Sheets

(56) References Cited

U.S. PATENT DOCUMENTS

| | | | |
|---|---|---|---|
| 4,513,363 | A | 4/1985 | Farrow |
| 4,779,181 | A * | 10/1988 | Traver et al. .................. 363/154 |
| 4,866,591 | A | 9/1989 | Cook et al. |
| 4,982,316 | A | 1/1991 | Nakayama |
| 5,050,058 | A | 9/1991 | April et al. |
| 5,063,487 | A | 11/1991 | Johnson et al. |
| 5,093,614 | A | 3/1992 | Woodworth |
| 5,107,410 | A | 4/1992 | Marsh et al. |
| 5,321,600 | A | 6/1994 | Fierheller |
| 5,387,821 | A | 2/1995 | Steciuk et al. |
| 5,406,470 | A | 4/1995 | Ridley et al. |
| 5,455,759 | A | 10/1995 | Paice |
| 5,694,307 | A * | 12/1997 | Murugan ........................ 363/37 |
| 5,781,428 | A | 7/1998 | Paice |
| 5,920,474 | A | 7/1999 | Johnson et al. |
| 5,994,795 | A * | 11/1999 | Gabillet ........................ 307/66 |
| 6,101,113 | A | 8/2000 | Paice |
| 6,256,213 | B1 | 7/2001 | Illingworth |
| 6,297,980 | B1 | 10/2001 | Smedley et al. |
| 6,498,736 | B1 * | 12/2002 | Kamath ........................ 363/44 |
| 6,650,557 | B2 | 11/2003 | Ferens et al. |
| 6,950,322 | B2 | 9/2005 | Ferens |
| 6,970,364 | B2 | 11/2005 | Batarseh et al. |
| 7,049,921 | B2 | 5/2006 | Owen |
| 7,317,624 | B2 * | 1/2008 | Lee et al. ........................ 363/44 |
| 7,375,996 | B2 * | 5/2008 | Singh et al. ................... 363/149 |
| 7,683,505 | B2 * | 3/2010 | Kunow et al. ................. 307/151 |
| 2008/0165553 | A1 | 7/2008 | Swamy |
| 2010/0073973 | A1 | 3/2010 | Ha et al. |
| 2010/0073975 | A1 | 3/2010 | Ha et al. |
| 2010/0097829 | A1 | 4/2010 | Uno et al. |
| 2010/0187914 | A1 | 7/2010 | Rada et al. |

OTHER PUBLICATIONS

Keiju Matsui and Masaru Hasegawa, "A Novel PFC Circuit for Three-phase utilizing Single Switching Device", Trends in Telecommunications Technologies, 2008, pp. 12.

Nobuhito Takeuchi, Keiju Matsui, Isamu Yamamoto, Masaru Hasegawa, Fukashi Veda, and Hideki Mori, "A Novel PFC Circuit for Three-Phase utilizing a Single Switching Device", 2008 IEEE, pp. 5.

Bhim Singh, Brij N. Singh, Ambrish Chandra, Kamal Al-Haddad, Ashish Pandey, and Dwarka P. Kothari, "A Review of Three-Phase Improved Power Quality AC-DC Converters", IEEE Transactions on Industrial Electronics, vol. 51, No. 3, Jun. 2004, pp. 641-660.

Yasuyuki Nishida, "A New Simple Topology for Three-phase Buck-Mode PFC Rectifier", IEEE 1996, pp. 531-537.

Mats Karlsson, Christer Thoren and Tadeus Wolpert, "A novel approach to the design of three-phase ACDC power converters with unity power factor", IEEE 1999, pp. 7.

Larry Lawhead, Randy Hamilton, John Horak, "Three Phase Transformer Winding Configurations and Differential Relay Compensation", Prepared by Basler Electric for presentation to the Georgia Tech Protective Relay Conference, May 2006, Feb. 14, 2006. Comments: info@basler.com, pp. 40.

Transformer Basics, "Three Phase Transformers", chapter 3, downloaded on Jul. 29, 2011 from http://www.federalpacific.com/university/transbasics/transbasics.html, pp. 8.

Clayton Engineering Company, "Transformer Configuration", www.claytonengineering.com, pp. 7.

Mike Holt, "Understanding the Basics of Delta Transformer Calculations", Nov. 1, 2004, http://www.ecmweb.com/nec/electric_understanding_basics_delta/index.html, pp. 4.

\* cited by examiner

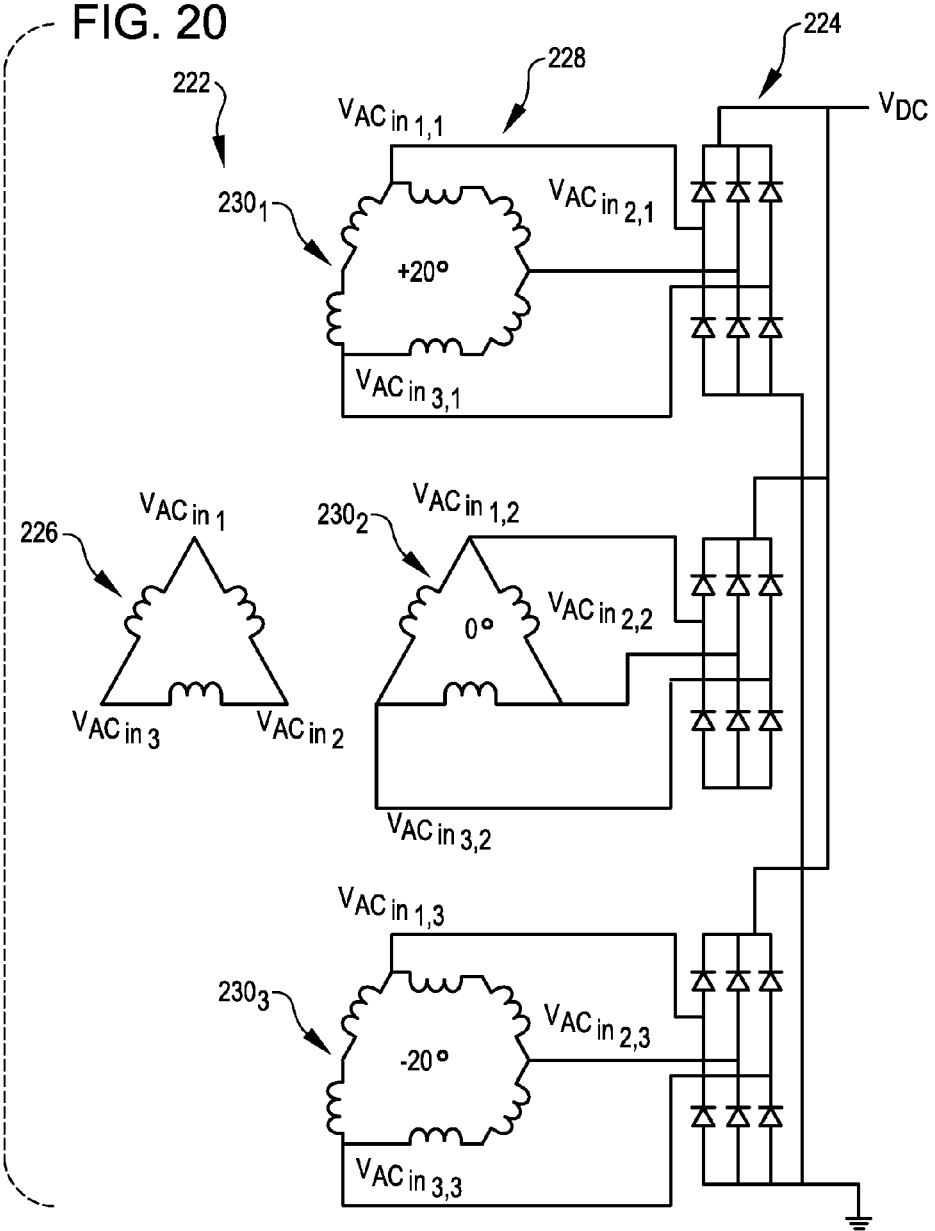

US 8,879,286 B2

FACILITY POWER SUPPLY WITH POWER-FACTOR CORRECTION

CLAIM OF PRIORITY

The present application claims the benefit of U.S. Provisional Patent Application Ser. No. 61/368,771 filed on Jul. 29, 2010, which application is incorporated herein by reference in its entirety.

SUMMARY

An embodiment of a power supply includes an input node, a converter stage, and a receptacle. The input node is operable to receive an input AC signal having peak portions and non-peak portions. The converter stage is operable to generate a DC power signal from the input AC signal and to cause a first current to be drawn from the input node during at least the non-peak portions of the input AC signal. And the receptacle is operable to carry the DC power signal.

For example, such a power supply may be installed in a facility such as a residence, office building, or manufacturing plant, or the facility's existing power supply may be retrofitted/upgraded to such a power supply, to provide the facility with one or more power receptacles that each carry a respective power-factor-corrected (PFC) DC voltage. Because the receptacle voltages are PFC voltages, the amount of wasted power dissipated in the facility power lines/wiring and in the main power lines from the power company may be significantly reduced, without requiring each piece of equipment (e.g., an appliance, machinery) that is wired/plugged into the receptacles to have an onboard power-factor corrector (PFC). This savings in wasted power may provide a significant cost savings to both the facility owner (e.g., lower electric bill) and the power company (e.g., lower power-generation and grid costs), and the ability to use equipment lacking onboard PFCs may reduce the purchase price of the equipment. Moreover, such a power supply may reduce the distortion on the facility and main power lines, and this may further reduce the amount of wasted power dissipated in the power lines, and may also reduce or eliminate the need for distortion filters for sensitive pieces of equipment or for isolating the distortion from the main power lines.

BRIEF DESCRIPTION OF THE DRAWINGS

FIG. 20 is a schematic diagram of another embodiment of a PFC substage that may be included in the PFC-and-DC-to-DC-converter stage of FIG. 6.

DETAILED DESCRIPTION

Figure 1:
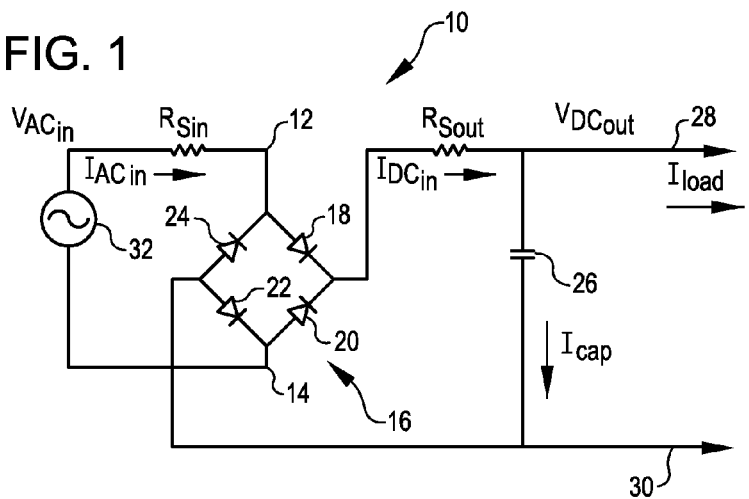
FIG. 1 is a schematic diagram of an embodiment of an AC-to-DC power supply without PFC.

One or more embodiments are described with reference to the drawings, wherein like reference numerals may be used to refer to like elements throughout. In the following description, for purposes of explanation, numerous specific details are set forth in order to provide a thorough understanding of the one or more embodiments. It may be evident, however, that one or more embodiments may be practiced without these specific details. In other instances, well-known structures and devices are shown in block diagram form in order to facilitate describing one or more embodiments.

Today, many utility districts require, or are considering requiring, that facilities such as, e.g., homes, office buildings, manufacturing plants, stadiums, and amusement parks, draw power from the main power grid with a power factor close to unity, e.g., >0.9. As discussed further below, such a requirement may not only save the owners of such facilities money on their electric bills, but may also reduce the amount of power that a power company needs to produce and the cost to build and maintain a power grid.

The power factor of a power-consuming entity (e.g., a facility, an electrically powered apparatus) is defined as the ratio of the real (e.g., useful) power that flows into a load portion of the entity divided by the apparent power that flows into a power-supply portion of the entity; and the power factor is a dimensionless value that has a range between zero and unity inclusive. A load portion of such an entity may be, e.g., a motor, lighting, display, or circuitry that requires electrical power to operate, and a power-supply portion may be a power supply that generates a suitable signal (e.g., a voltage or current signal) for powering the load portion. For example, if a supply portion generates a DC voltage $V_{LOAD}$ to power a load portion, and the load portion draws a DC current $I_{LOAD}$, then the real power equals $I_{Load} \cdot V_{Load}$; and if a voltage $V_{IN}$ and current $I_{IN}$ input to the supply portion are an AC voltage and current (e.g., from a facility power outlet), then the apparent power equals $V_{IN\_rms} \cdot I_{IN\_rms}$. Therefore, in such an example, the power factor of the entity would equal $(I_{Load} \cdot V_{Load})/(V_{IN\_rms} \cdot I_{IN\_rms})$.

The closer the power factor is to unity, the more efficient is the transfer of power from the input source (e.g., the power company via a wall outlet) to the load; conversely, the closer the power factor is to zero, the less efficient is the transfer of power from the input source to the load. That is, for a given load, the higher the power factor, the less power the entity needs to draw from the input source, and the less power that is dissipated outside of the load (e.g., losses in the power lines and in the power supply itself); conversely, the lower the power factor, the more power the entity needs to draw from the input source, and the more power that is dissipated outside of the load.

Looking at power factor in a different way, where the input voltage is a sinusoid, a low power factor may be evidenced by an apparatus drawing pulses of current from the input source (e.g., the power company via a wall outlet) only during the peaks of the input voltage—for example, as further discussed below, a full-wave rectifier with no power-factor correction may cause an entity to draw current in such a manner.

But drawing a current from the input power source only during the peaks of the input voltage, particularly if a significant number of power-company customers simultaneously do the same, may cause problems such as increased peak-current draw from the input source, increased power losses in the power-supply lines and in the entity itself, and increased distortion to the voltage waveform on the power-supply lines.

One way to combat the problems caused by a significant number of customers simultaneously drawing power with a low power factor is for the power company to increase its generating capacity and the size of the power-supply lines to increase peak-current-generating capacity and to reduce the supply-line resistance, respectively.

But such a solution would be a significant and expensive undertaking for power companies, and would go against the societal push to "go green" by reducing energy consumption instead of by compensating for, and thus potentially encouraging, increased energy consumption.

Consequently, power companies often believe that the better solution to the low-power-factor problem is to require electric customers to incorporate power-factor correction into their facilities.

One way for a customer to incorporate power-factor correction into his/her facility is to use only items (e.g., appliances, equipment) that incorporate onboard power-factor correctors.

But because items with onboard power-factor correctors may be more expensive than their counterparts without power-factor correctors, purchasing such items to impart a suitable power factor to a facility may be prohibitively expensive. And manufacturers may shy away from including onboard power-factor correctors in their products to save manufacturing costs and to reduce the costs of their products to consumers.

Alternatively, as discussed in more detail below, one may provide a facility with a power supply having power-factor correction. Such a power supply may include one or more uniquely identified outlets that provide one or more power-factor-corrected DC voltage levels. For example, one or more first outlets may provide 12 VDC for items such as computers, and one or more second outlets may provide 400 VDC for items such as washers, driers, and electric-car battery chargers. Because the facility power supply performs the power-factor correction, there is no need for the items powered by the supply to include onboard power-factor correctors. Furthermore, because the facility power supply is providing one or more DC-voltage outlets, there is no need for the items plugged into (or hardwired to) these outlets to include onboard AC-to-DC converters. And allowing manufacturers to omit power-factor-correctors and AC-to-DC converters from their product items may reduce the costs of these items. Consequently, the costs saved by the facility owner due to the increased facility power factor and by the reduced costs of electrical items may more than offset the cost of installing such a facility power supply or of retrofitting/upgrading an existing facility power supply to provide power-factor-corrected DC voltages. And if a significant number of facilities in a power district install such a PFC power supply, then the savings to the power company in reduced grid costs and reduced power generation, and the resulting savings in overall energy consumption and carbon emissions, may be significant.

Before discussing an embodiment of such a facility power supply with PFC, the following issues are discussed in conjunction with FIGS. 1-5 to provide a context for the benefits that may be provided by such an embodiment: low power factor, causes of low power factor, problems associated with low power factor, and an embodiment of a technique for increasing power factor.

FIG. 1 is a schematic diagram of an AC-to-DC power supply 10 without PFC—the supply may also be called an AC-to-DC converter—where the supply includes input nodes 12 and 14, a full-wave rectifier 16, which includes diodes 18, 20, 22, and 24, a filter capacitor 26, an output node 28 for carrying the generated supply voltage $VDC_{out}$ and sourcing a current $I_{load}$, and an output reference node (e.g., ground) 30. The power supply 10 may include other components (e.g., an isolation transformer) that are omitted from FIG. 1. Furthermore, $R_{Sin}$ represents the collective real resistance of the power lines/wires that couple the input nodes 12 and 14 to an AC power source (e.g., a power-company transfer station) 32 that provides a sinusoidal input voltage $VAC_{in}$, and $R_{Sout}$ represents the collective real resistance of the power lines/wires that couple the rectifier 16 to the capacitor 26 and the load.

Figure 2:
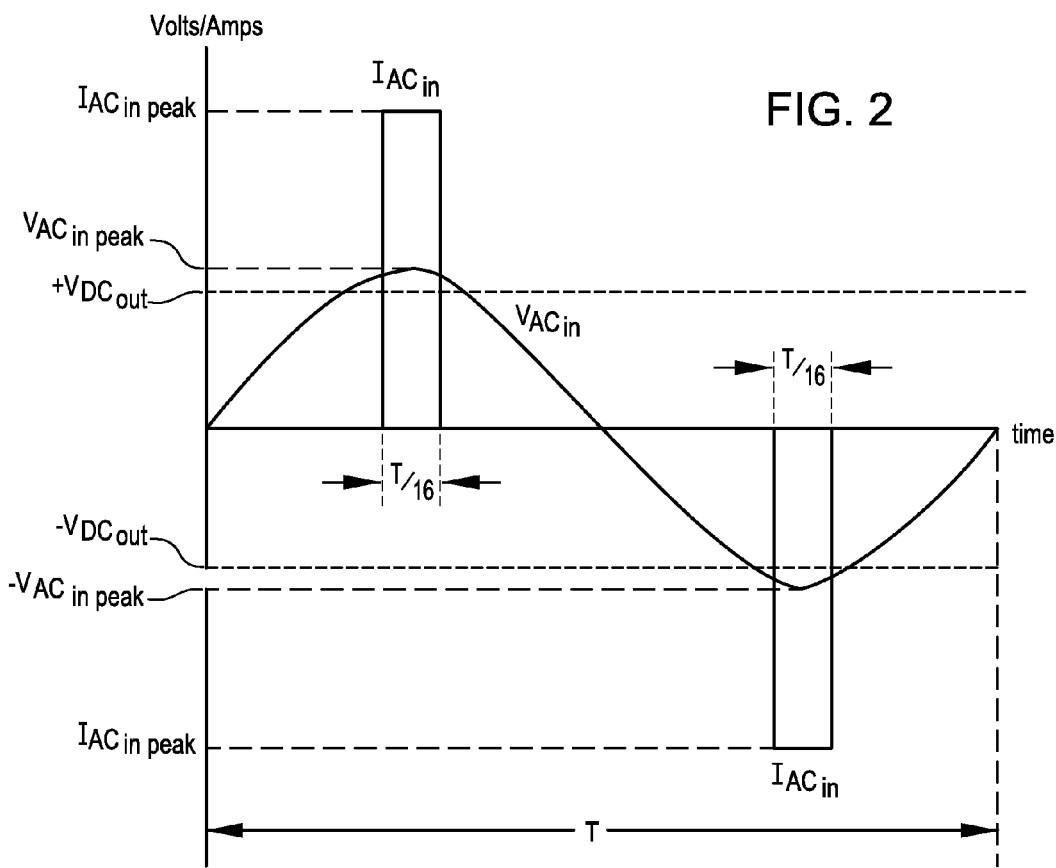
FIG. 2 is a plot of an example of the voltage waveform at the input node of the power supply of FIG. 1 overlaying an example of the current waveform into the same input node.

FIG. 2 is a plot of an example of $VAC_{in}$ across the input signal nodes 12 and 14 and of an example of a current $IAC_{in}$ into the input signal node 12, where the AC power source 32 provides both $VAC_{in}$ and $IAC_{in}$ and where the period of $VAC_{in}$ is T. For example, in the United States T≈1/60 Hz≈16.7 milliseconds (ms).

Referring to FIGS. 1 and 2, an example of the operation of the AC-to-DC power supply 10 is described. In this example, it is assumed that $VAC_{in}$ is sinusoidal and that $I_{load}$ is a DC current.

During a positive half of $VAC_{in}$, the diodes 18 and 22 conduct only when the amplitude of $VAC_{in}$ is greater than the sum of the amplitude of $VDC_{out}$ and the forward voltages of the diodes 18 and 22. But for example purposes, one may assume that the forward voltages of the diodes are negligible compared to the peak amplitude of $VAC_{in}$; therefore, one may assume that the diodes 18 and 22 conduct only when the amplitude of $VAC_{in}$ is greater than approximately $VDC_{out}$. And in this example, it is further assumed that in the steady state, $VAC_{in} > VDC_{out}$ only during periods that are T/16 seconds long and that are centered about the positive peaks ($VAC_{in\_peak}$) of $VAC_{in}$.

While the diodes 18 and 22 are conducting, a positive value of the current $IAC_{in}$ flows into the input signal node 12, through the diode 18, through the parallel combination of the capacitor 26 and the load (not shown in FIG. 1) such that $I_{cap}+I_{load}=IAC_{in}$, through the diode 22, and back to the AC source 32 via the input node 14. And although for ease of analysis $IAC_{in}$ is described as being a rectangular pulse, $IAC_{in}$ may have another wave shape such as a triangular wave shape or may have a different time duration.

Similarly, during a negative half of $VAC_{in}$, the diodes 20 and 24 conduct only when the amplitude of $VAC_{in}$ is approximately less than $-VDC_{out}$. In this example, it is assumed that in the steady state, $VAC_{in}<-VDC_{out}$ only during period that are T/16 seconds long and that are centered about the negative peaks ($-VAC_{in\_peak}$) of $VAC_{in}$.

While the diodes 20 and 24 are conducting, a negative value of the current $IAC_{in}$ flows into the input node 14, through the diode 20, through the parallel combination of the capacitor 26 and the load (not shown in FIG. 1) such that $I_{cap}+I_{load}=|-IAC_{in}|$, through the diode 24, and back to the AC source 32 via the input node 12. Again, for ease of analysis, $-IAC_{in}$ is described as being a rectangular pulse, although it may have another wave shape such as a triangular wave shape or it may have a different time duration.

According to conventional circuit theory, because $I_{load}$ is assumed to be a DC current and because $IAC_{in}$ is assumed to include rectangular pulses of current that flow, in the aggregate, during only ⅛ of the period T of $VAC_{in}$, $IAC_{in\_peak}=8\cdot I_{load}$.

Consequently, the power factor of the power supply 10 equals $VDC_{out}\cdot I_{load}/((VAC_{in\_peak}/\sqrt{2})\cdot(8\cdot I_{load}/\sqrt{8}))$, and the power wasted/lost via dissipation in $R_{Sin}$ and $R_{Sout}$ equals $(8\cdot I_{load})^2(R_{Sin}\cdot R_{Sout})/8=8\cdot I_{load}^2(R_{equivalent})$. For example, the power factor of the supply 10 may be in the range of approximately 0.4-0.6, which is considered to be low by industry standards.

Figure 3:
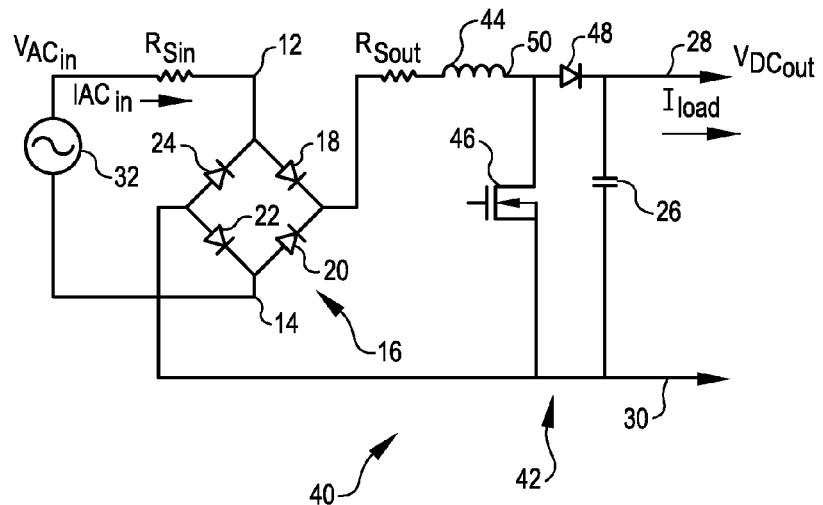
FIG. 3 is a schematic diagram of an embodiment of a AC-to-DC power supply with active PFC.

FIG. 3 is a schematic diagram of an embodiment of an AC-to-DC power supply 40 with PFC, where like numerals may reference components common to the supply 40 and the supply 10 of FIG. 1. The supply 40 effectively includes the supply 10 with the addition of a PFC circuit 42 coupled between the rectifier 16 and the capacitor 26. The PFC circuit 42 includes an inductor 44 having an inductance L, a switching transistor 46, and a diode (or other unidirectional component or circuit) 48. The PFC circuit 42 may also include additional components that are omitted from FIG. 3 for brevity. As discussed below, the circuit 42 may impart to the power supply 40 a power factor that is higher (e.g., >0.9) than the power factor of the supply 10 by effectively "spreading out" $IAC_{in}$ over a portion of the period T greater than T/8 such that $IAC_{in}$ flows at least during portions of $VAC_{in}$ other than the peak portions of $VAC_{in}$. For example, the circuit 42 may cause $IAC_{in}$ to have a wave shape and phase that are respectively similar to the wave shape and phase of $VAC_{in}$.

Figure 4:
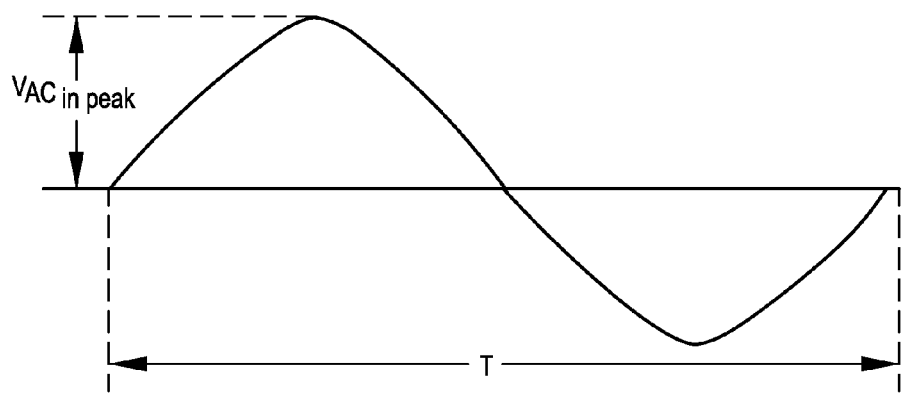
FIG. 4 is a plot of an example of the voltage waveform at the input node of the power supply with PFC of FIG. 3.

FIG. 4 is a plot of an example of $VAC_{in}$ across the input nodes 12 and 14 of the power supply 40 of FIG. 3.

Figure 5:
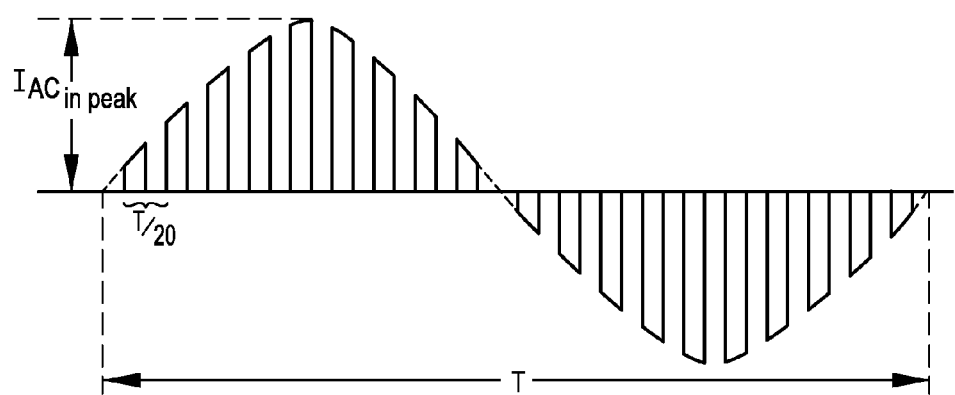
FIG. 5 is a plot of an example of the current waveform into the input node of the power supply with PFC of FIG. 3.

FIG. 5 is a plot of an example of $IAC_{in}$ into the input node 12 of the power supply 40 of FIG. 3.

Referring to FIGS. 3-5, an example of the operation of the AC-to-DC power supply 40 is described. In this example, the same assumptions (i.e., VAC is sinusoidal and $I_{load}$ is a DC current) are made as were made above in the example of the operation of the power supply 10 of FIG. 1.

During both the positive and negative halves of $VAC_{in}$, the transistor 46 switches at a frequency that is greater, for example, approximately 10-1,000 times greater, than the frequency 1/T of $VAC_{in}$; in this example, the transistor switches at a frequency that is approximately equal to 20/T, which is twenty times the frequency of $VAC_{in}$.

While the transistor 46 is on, it couples a node 50 of the inductor 44 to the reference node 30 (ground in this example) such that $IAC_{in}$ flows through the rectifier 16 and the inductor, and thus charges the inductor.

More specifically, $IAC_{in}$ ramps up at a rate approximately equal to $VAC_{in}/L$ (again assuming the diode drops are negligible) until the transistor 46 turns off. For purposes of example, however, the current pulses that compose $IAC_{in}$ are shown as being rectangular, instead of triangular, in FIG. 5.

While the transistor 46 is off, the inductor 44 discharges through the diode 48 to the capacitor 26 and load (not shown in FIG. 3) such that $IAC_{in}$ ramps down at a rate approximately equal to $((VDC_{out}-VAC_{in})/L$ assuming that the drop across the diode 48 is negligible. But again, for ease of explanation, the current pulses that compose $IAC_{in}$ are show as being rectangular, instead of triangular, in FIG. 5.

Therefore, the transistor 46 generates pulses of current $IAC_{in}$ throughout the period T of $VAC_{in}$, not just during the peak portions of $VAC_{in}$. Because the amplitudes of these $IAC_{in}$ pulses are proportional to the instantaneous amplitude of $VAC_{in}$, these pulses of current, when averaged, yield a wave shape (here sinusoidal) and phase similar to the wave shape and phase of $VAC_{in}$.

Generally, the higher the switching frequency of the transistor 46, the greater the number of $IAC_{in}$ pulses during each period T of $VAC_{in}$, and the more similar are the wave shape and phase of $IAC_{in}$ to the wave shape and phase of $VAC_{in}$; therefore, in general, the higher the switching frequency of the transistor 46, the closer the power factor of the power supply 40 is to its ideal value of unity.

Consequently, if, to facilitate the analysis, one assumes that the PFC circuit 42 causes $IAC_{in}$ to be a sinusoid having the same frequency and phase as $VAC_{in}$, then the power supply 40 has the following operating parameters: $0.637\cdot IAC_{in\_peak}=I_{load}$, the power factor of the power supply 40 equals approximately $VDC_{out}\cdot I_{load}/((VAC_{in}/\sqrt{2})\cdot(1.57\cdot I_{load}/\sqrt{2}))$, and the power wasted/lost via dissipation in $R_{Sin}$ and $R_{Sout}$ equals approximately $(1.57\cdot I_{load}/\sqrt{2})^2(R_{Sin}+RSout)=1.23\cdot I_{load}^2(R_{Sin}+R_{Sout})=1.23\cdot I_{load}^2(R_{equivalent})$.

Therefore, compared to the non-PFC power supply 10 of FIG. 1, the power supply 40 has a power factor that is increased by a factor of approximately 2.5, and reduces the power dissipation in $R_{Sin}$ and $R_{Sout}$ by a factor of approximately 6.5.

Referring to FIGS. 1-5, even though the above examples may be rough estimations, one may see that correcting the power factor of an entity may significantly decrease power losses caused by generating a DC supply voltage from an AC source. Furthermore, even though the above example is for a single phase of $VAC_{in}$, a similar analysis may apply to each phase of a multiphase AC input voltage.

Consequently, if one considers the number of facilities coupled to the power grid, he/she may see that providing PFC for each so-coupled facility may result in a significant reduction in power that is wasted/lost due to low power factors. In fact, it has been estimated that each 1 Watt (W) reduction in a facility's power losses due to increasing the facility's power factor may translate to up to a 3 W reduction in the power losses sustained by the power company, where such a reduction may be due to, e.g., less power dissipation in the power-distribution lines and lower overall power generation. And this reduction in lost power may translate into a significant reduction in carbon emissions from power districts that include electrical-power-generation plants that are powered by fossil fuels such as coal and natural gas.

Figure 6:
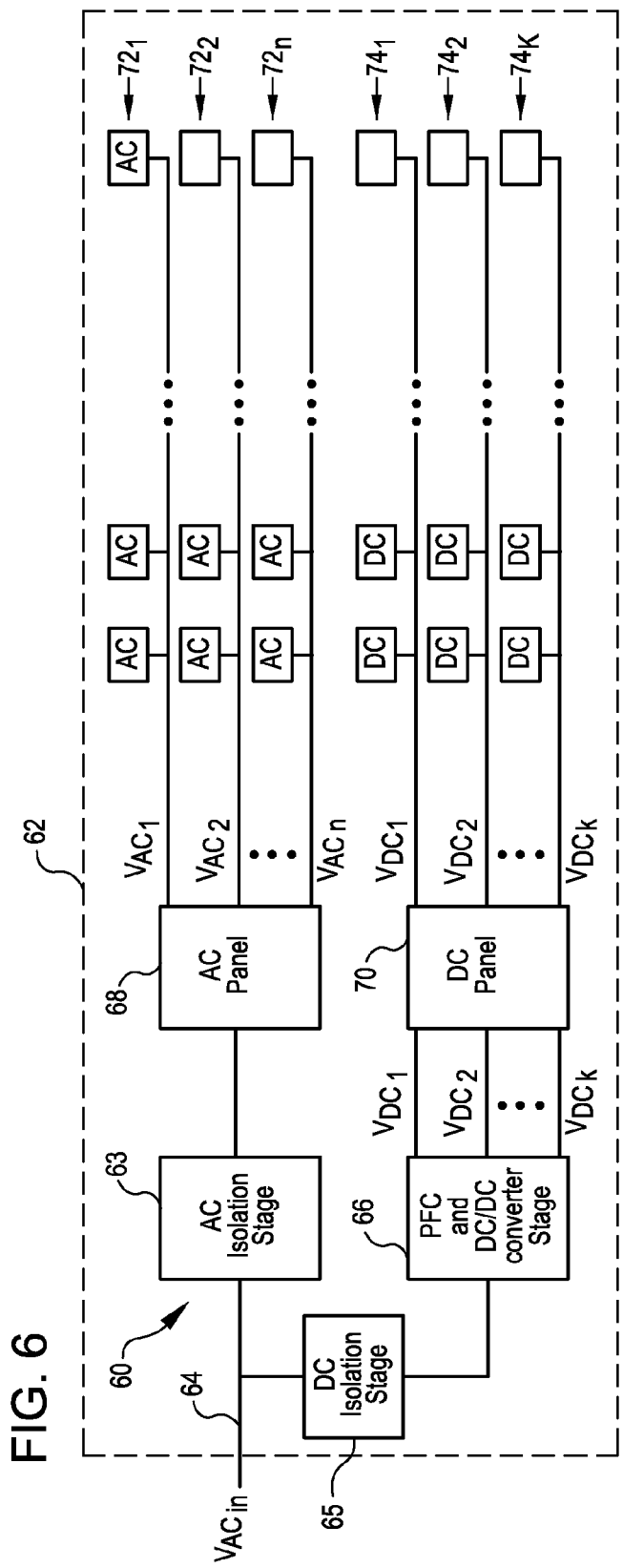
FIG. 6 is a block diagram of an embodiment of a facility and a facility power supply with PFC.

FIG. 6 is a block diagram of an embodiment of an AC-to-DC PFC power supply 60 for an embodiment of a facility 62 such as a home, office or residential building, mall or other retail building, manufacturing plant, or amusement park, stadium, or other indoor or outdoor venue. Although the power supply 60 is described as being located within the facility 62, the supply may be located elsewhere, such as outside, but in the vicinity, of the facility.

The power supply 60 includes an input line 64, an AC isolation stage 63, a DC isolation stage 65, a PFC-with-DC-to-DC-converter stage 66, an AC wiring panel 68, a DC wiring panel 70, one or more groups $72_1$-$72_n$ of AC outlets, and one or more groups $74_1$-$74_k$ of DC outlets.

The input line 64 is coupled to receive an input voltage $VAC_{in}$ from a source such as the power company that serves customers in the region of the facility 62. $VAC_{in}$ may be a single or multiphase voltage, and, although not shown in FIG. 6, the input line 64 may have a respective input node for each phase of $VAC_{in}$, plus one or more additional input nodes that act, e.g., as reference or return nodes. For example, where $VAC_{in}$ is a three-phase voltage, the input line 64 may have five input nodes: a respective input node or each voltage phase (a total of three nodes in this example), a neutral/reference node, and an earth-ground node, which may not go to the power company but which may instead be coupled to a conventional earth ground (e.g., an underground water pipe or steel bar driven into the ground) for the facility.

The AC isolation stage 63 galvanically isolates the AC wiring panel 68 and the groups $72_1$-$72_n$ of AC outlets from the source of $VAC_{in}$. The isolation stage 63 may include an isolation transformer or other isolation components or circuitry. In an embodiment, the isolation stage 63 outputs an isolated version of $VAC_{in}$ that has approximately the same amplitude and phase as $VAC_{in}$; consequently, for purposes of example, hereinafter the isolation stage 63 is described as outputting $VAC_{in}$.

Similarly, the DC isolation stage 65 galvanically isolates the DC wiring panel 70 and the groups $74_1$-$74_n$ of DC outlets from the source of $VAC_{in}$. Like the AC isolation stage 63, the isolation stage 65 may include an isolation transformer or other isolation components or circuitry. In an embodiment, the isolation stage 65 outputs an isolated version of $VAC_{in}$ that has approximately the same amplitude and phase as $VAC_{in}$; consequently, for purposes of example, hereinafter the isolation stage 65 is described as outputting $VAC_{in}$.

The PFC-with-DC-to-DC-converter stage 66 converts $VAC_{in}$ from the DC isolation stage 65 into one or more PFC DC voltages $VDC_1$-$VDC_k$. The stage 66 may include any type of active PFC substage such as the circuit 42 of FIG. 3, or may include any type of passive PFC substage, examples of which are described below. Furthermore, the stage 66 may include one or more DC-to-DC-converter substages for converting the one or more DC voltages generated by the one or more PFC substages into $VDC_1$-$VDC_k$.

Alternatively, the DC isolation stage 65 and the PFC-with-DC-to-DC-converter stage 66 may be combined into a single stage. For example, this combined stage may include a transformer having a primary winding coupled to receive $VAC_{in}$ and having a secondary winding that is magnetically coupled to the primary winding and that provides the one or more PFC DC voltages $VDC_1$-$VDC_k$. The magnetic coupling between the first and primary and secondary windings provides galvanic isolation, and one may design the turns ratio between the primary and secondary windings such that at least one of the PFC DC voltages $VDC_1$-$VDC_k$ has a different amplitude than at least another of the PFC DC voltages $VDC_1$-$VDC_k$. Generating $VDC_1$-$VDC_k$ with a transformer is further described below in conjunction with FIGS. 9-20.

The AC wiring panel 68 distributes respective versions $VAC_1$-$VAC_n$ of $VAC_{in}$ from the AC isolation stage 63 to each of the AC-outlet groups $72_1$-$72_n$. For example, if $VAC_{in}$ includes three phases, then the panel 68 may distribute a single-phase voltage (e.g., 110 VAC in the United States) $VAC_1$ to the one or more outlets in the group $72_1$, a two-phase voltage (e.g., 220 VAC in the United States) $VAC_2$ to the one or more outlets in the group $72_2$, and a three-phase voltage (e.g., three lines of 220 VAC 120° apart in the United States) $VAC_3$ to the one or more outlets in a group $72_3$ (although the voltage $VAC_3$ and group $72_3$ of AC outlets are not shown in FIG. 6, this voltage and group may be represented in FIG. 6 by $VAC_n$ and $72_n$ where n=3). The panel 68 may also include circuit breakers for each AC outlet, or for each subgroup of the AC outlets.

The DC wiring panel 70 distributes a respective DC voltage $VDC_1$-$VDC_k$ from the PFC-and-DC-to-DC-converter stage 65 to each of the DC-outlet groups $74_1$-$74_k$. For example, the panel 70 may distribute to the one or more outlets in the group $74_1$ a DC voltage $VDC_1$ (e.g., 12 VDC) suitable for lower-power items such as computers, televisions, lighting (including built-in lighting), and chargeable items such as phones, may distribute to the one or more outlets in the group $74_2$ a DC voltage $VDC_2$ (e.g., 100 VDC) suitable for higher-power items such as small kitchen appliances, vacuum cleaners, and power tools, and may distribute to the one or more outlets in a group $74_3$ a DC voltage $VDC_3$ (e.g., 400 V) suitable for even higher-power items such as large appliances and a system for charging the battery in an electric vehicle (although the voltage $VDC_3$ and the outlet group $74_3$ are not shown in FIG. 6, this voltage and outlet group may be represented in FIG. 6 by the voltage $VDC_k$ and the group $74_k$ where k=3). The panel 70 may also include circuit breakers for each DC outlet, or for each subgroup of the DC outlets.

Each of the AC outlets in the group $72_1$ may include a unique color or receptacle configuration to identify the outlet as providing a particular AC voltage $VAC_1$ and to prevent one from inadvertently trying to "plug in" an item that is not compatible with the voltage $VAC_1$ provided by the output. For example, if the outlets in the group $72_1$ carry $VAC_1$ equal to single-phase 110 VAC, then these outlets may have a receptacle configuration that is compatible with only items that can run on single-phase 110 VAC. Furthermore, these outlets may have a color, text, or other indicator that identifies these outlets as being for only single-phase 110 VAC items. Moreover, as discussed above, the outlets in the group $72_1$ may be arranged in subgroups of one or more, where each subgroup forms a respective circuit that is coupled to a respective breaker in the wiring panel 68. In addition, one or more of the AC outlets in the outlet group $72_1$ may not include receptacles, but may instead include a structure that allows an item to be "hardwired" to the outlet. For example, a built-in item like a recessed ceiling light or an electric oven may not have a "plug" for an outlet with a receptacle, but may instead have only wires that are coupled to the wires in the outlet with, e.g., wire nuts.

Each of the AC outlets in the groups $72_2$-$72_n$ may be similar to the outlets in the group $72_1$, except that the outlets in each group $72_2$-$72_n$ may respectively carry an AC voltage $VAC_2$-$VAC_n$ of a different type (e.g., two-phase or three-phase) or level (e.g., 220 VAC) than the outlets in the group $72_1$; therefore, the outlets in each group $72_2$-$72_n$ may include a different color and receptacle configuration to identify the outlets as providing a particular AC voltage and to prevent one from inadvertently trying to "plug in" an item that is not compatible with the voltage provided by the outlets.

Each of the DC outlets in the outlet group $74_1$ may include a unique color and receptacle configuration to identify the outlet as providing a particular DC voltage $VDC_1$ and to prevent one from inadvertently trying to "plug in" an item that is not compatible with the voltage $VDC_1$ provided by the outlet. For example, if the outlets in the group $74_1$ carry a voltage $VDC_1$ equal to 12 VDC, then these outlets may have a receptacle configuration that is compatible with only items that can run on 12 VDC. Furthermore, these outlets may have a color, text, or other indicator that identifies these outlets as being for 12 VDC items. Moreover, as discussed above, the outlets in the group $74_1$ may be arranged in subgroups of one or more, where each subgroup forms a respective circuit that is coupled to a respective breaker in the DC wiring panel 70. In addition, one or more of the outlets in the group $74_1$ may not include receptacles, but may instead include a structure that allows an item to be "hardwired" to the outlet. For example, a built-in item like recessed lighting may not have a "plug" for an outlet with a receptacle, but may instead have only wires that are coupled to the wires in the outlet with, e.g., wire nuts.

Each of the DC outlets in the groups $74_2$-$74_k$ may be similar to the outlets in the group $74_1$, except that the outlets in each group $74_2$-$74_k$ may provide a respective voltage $VDC_2$-$VDC_k$ of a different level (e.g., 100 VDC, 400 VDC, 500 VDC) than the outlets in the group $74_1$; therefore, each group $74_2$-$74_k$ of outlets may include a different color and receptacle configuration to identify the outlets as providing a particular DC voltage and to prevent one from inadvertently trying to "plug in" an item that is not compatible with the voltage provided by the outlets.

Still referring to FIG. 6, it is estimated that an embodiment of the PFC power supply 60 may reduce the amount of electricity consumed by the facility 62 by up to 40% or more. With this level of savings, it is anticipated that an embodiment of the power supply 60 may qualify a facility 62 for an Energy Star® rating/label, and that installing an embodiment of the power supply 60 may qualify the owner of the facility for available government rebates directed toward energy-saving or carbon-emission-reducing improvements.

Furthermore, as discussed above, items designed for use with the DC outlets in the outlet groups $74_1$-$74_k$ may cost less because manufacturers may be able to omit AC-to-DC converters and PFC circuits from these items. Alternatively, a manufacturer may design an item to work from either an AC or DC input voltage, so that the item may be plugged into an AC or DC outlet. And, a manufacturer may design an item with a DC-to-DC converter to generate a DC voltage that is different from the DC voltage provided by a DC outlet.

Moreover, alternate embodiments of the PFC power supply 60 are contemplated. For example, the PFC-with-DC-to-DC-converter stage 66 may be configurable so that the number and levels of the generated DC voltages is adjustable to the needs of the facility 62. Furthermore, the wires that are used to couple the DC outlets $74_1$-$74_n$ to the DC wiring panel 70, and the wires used to couple the DC wiring panel to the input line 64, may be wires already existing in the facility 62 to carry AC voltages; similarly, the DC wiring panel may be a panel, or portion of a panel, already existing in the facility. Consequently, one may retrofit the facility 62 to include the power supply 60 by using existing components, like wiring and panels, from an existing facility power supply. Moreover, the facility 62 may include, e.g., in its walls, outlet clusters that each include one outlet from each group of outlets $72_1$-$72_n$ and $74_1$-$74_k$. In addition, because of the AC outlet groups $72_1$-$72_n$, the power supply 60 may be backwards compatible with all-AC power supplies because it allows the use of existing items that are configured to run on AC power. Furthermore, although described as having one input line 64 with multiple nodes/wires, the power supply 60 may have multiple input lines each with single or multiple nodes/wires. Moreover, although shown as including two isolation stages 63 and 65 for its AC and DC branches, the power supply 60 may include a single isolation stage for both branches. In addition, where the isolation stages 63 and 65 include transformers, one or both of the isolation stages may include step-up and step-down frequency converters to reduce the sizes of the transformers. Furthermore, one or both of the AC and DC isolation stages 63 and 65 may be omitted from the power supply 60. In addition, the values of $VAC_1$-$VAC_n$ and $VDC_1$-$VDC_n$ may be standardized within a utility district, or within any other jurisdiction such as an entire country.

Figure 7:
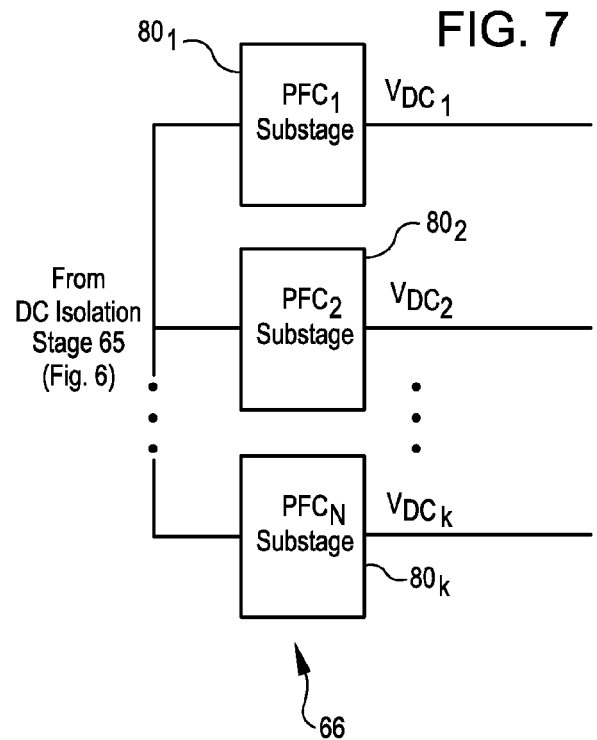
FIG. 7 is a block diagram of an embodiment of the PFC-and-DC-to-DC-converter stage of FIG. 6.

FIG. 7 is a block diagram of an embodiment of the PFC-and-DC-to-DC-converter stage 66 of FIG. 6. The stage 66 includes one PFC substage $80_1$-$80_k$ for respectively generating each DC voltage $VDC_1$-$VDC_k$, and includes no DC-to-DC-converter substages. Each of the PFC substages $80_1$-$80_k$ may be any suitable type of PFC circuitry such as the AC-to-DC PFC power supply 40 described above in conjunction with FIG. 3 (active PFC) or below (passive PFC). Alternatively, the stage 66 may include one or more DC-to-DC-converter substages coupled to respective ones of the PFC substages $80_1$-$80_k$ to generate respective ones of $VDC_1$-$VDC_k$ from the voltages generated by the respective ones of the PFC substages.

Figure 8:
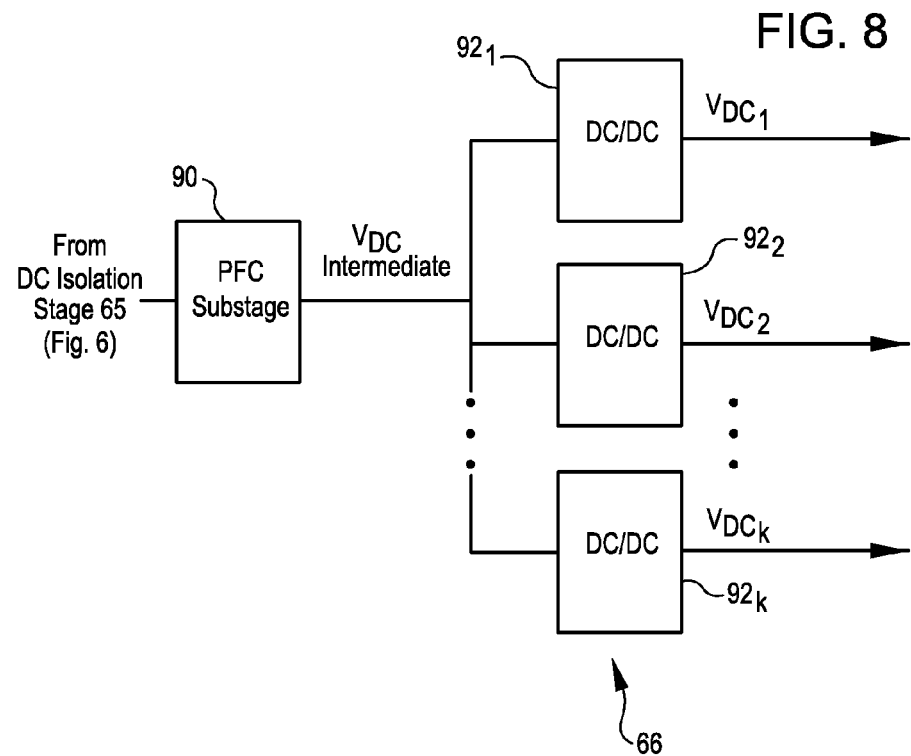
FIG. 8 is a block diagram of another embodiment of the PFC-and-DC-to-DC-converter stage of FIG. 6.

FIG. 8 is a block diagram of another embodiment of the PFC-and-DC-to-DC-converter stage 66 of FIG. 6. The stage 66 includes a PFC substage 90 and DC-to-DC-converter substages $92_1$-$92_k$ for respectively generating the DC voltages $VDC_1$-$VDC_k$ from the DC voltage $VDC_{intermediate}$ generated by the PFC substage. Each of the DC-to-DC-converter substages $92_1$-$92_k$ may include any suitable type of DC-to-DC converter such as a buck converter, boost converter, or buck-boost converter.

Figure 9:
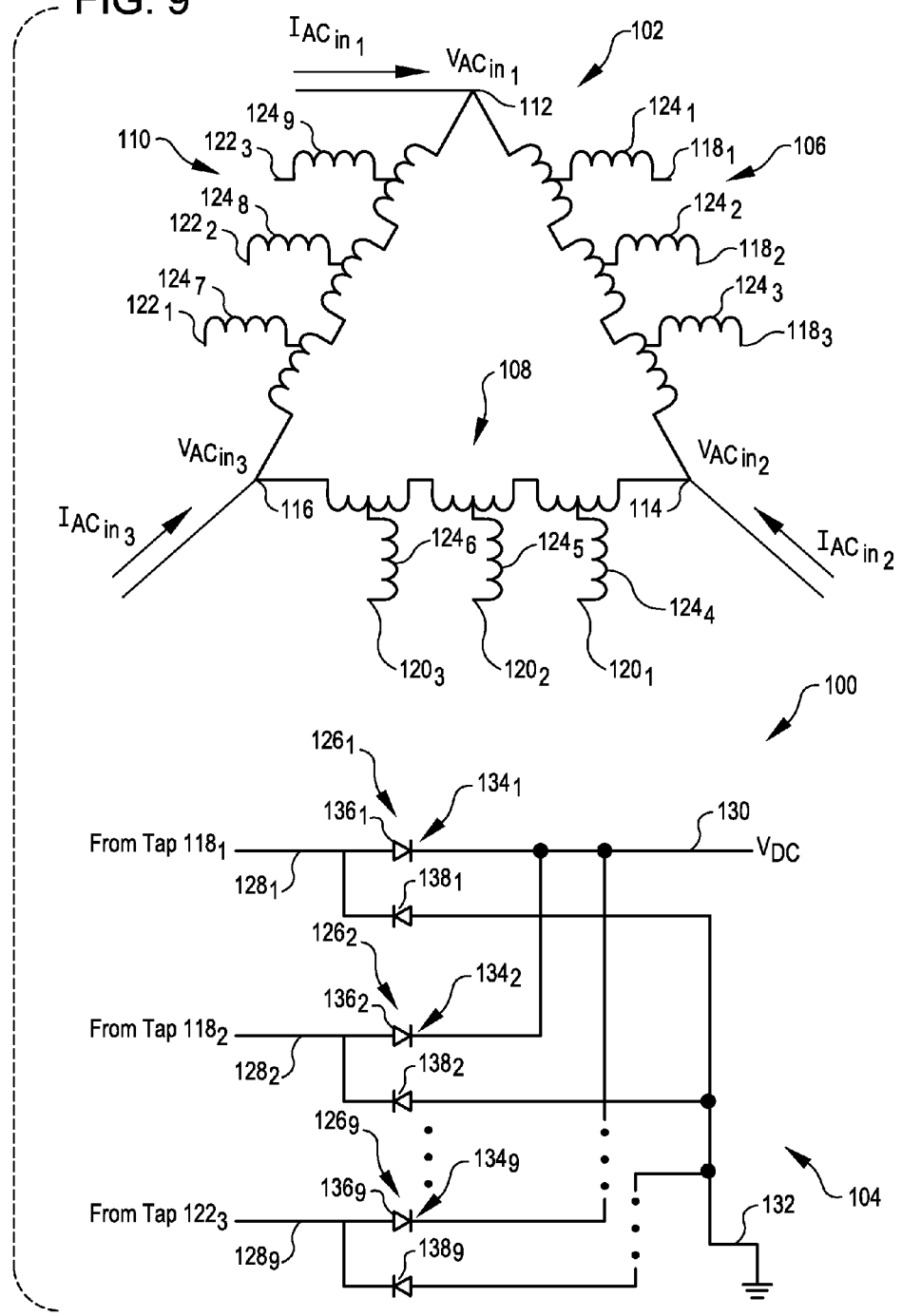
FIG. 9 is a schematic diagram of another embodiment of the PFC-and-DC-to-DC-converter stage of FIG. 6.

FIG. 9 is a schematic diagram of an embodiment of a PFC substage 100, which may be used as, or included as part of, one or more of the PFC substages 80 and 90 of FIGS. 7 and 8. In the described embodiment, the PFC substage 100 is designed for $VAC_{in}$ being a three-phase voltage having three phases/components $VAC_{in1}$, $VAC_{in2}$, and $VAC_{in3}$, which may be, for example, three 220 VAC components separated from each other by phase shifts of 120°.

The PFC substage 100 includes a coil assembly 102 and a rectifier assembly 104. A coil assembly like the coil assembly 102 is sometimes referred to as an auto transformer, for example, when it is paired with a primary coil assembly that effectively magnetically couples $VAC_{in1}$-$VAC_{in3}$ to the nodes 112-116 as described below.

The coil assembly 102 includes three coils 106, 108, and 110, which are coupled in a delta configuration between respective pairs of nodes 112, 114, and 116. Each of the coils 106, 108, and 110 has at least one respective tap. For example, in the described embodiment, the coil 106 has three taps $118_1$-$118_3$, the coil 108 has three taps $120_1$-$120_3$, and the coil 110 has three taps $122_1$-$122_3$. The taps 118, 120, and 122 may be taken directly from the coils 106, 108, and 110, respectively, or may be taken from respective coil segments 124 that are coupled to respective locations along the coils. Each of the nodes 112, 114, and 116 may be coupled to a respective one of the power-supply input nodes 64 (FIG. 6) that carry the three input-voltage components $VAC_{in1}$, $VAC_{in2}$, and $VAC_{in3}$; or, the coils 106, 108, and 110 may form secondary windings of a transformer having one or more primary windings (not shown in FIG. 9) that magnetically couple each of the voltage differences $VAC_{in1}$-$VAC_{in2}$, $VAC_{in2}$-$VAC_{in3}$, and $VAC_{in1}$-$VAC_{in3}$ across a respective one of the coils 106, 108, and 110. If the coils 106, 108, and 110 are part of such a transformer, then this transformer may provide galvanic isolation between the source of $VAC_{in}$ and the PFC-with-DC-to-DC-converter stage 66 of the power supply 60 (FIG. 6) such that the DC isolation stage 65 (FIG. 6) may be omitted.

The rectifier assembly 104 includes a respective rectifier unit $126_1$-$126_9$ for each tap of the coils 106, 108, and 110, where each rectifier unit has a respective input node $128_1$-$128_9$ coupled to a respective coil tap, a respective output node coupled to a common rectifier output node 130, and a respective reference node coupled to a common rectifier reference node (e.g., a DC ground) 132. For example, in an embodiment, the rectifier assembly 104 includes rectifier units $126_1$-$126_3$ having input nodes $128_1$-$128_3$ respectively coupled to the taps $118_1$-$118_3$ of the coil 106, rectifier units $126_4$-$126_6$ having input nodes $128_4$-$128_6$ respectively coupled to the taps $120_1$-$120_3$ of the coil 108, and rectifier units $126_7$-$126_9$ having input nodes $128_7$-$128_9$ respectively coupled to the taps $122_1$-$122_3$ of the coil 110.

Each rectifier unit $126_1$-$126_9$ includes a respective half-bridge circuit $134_1$-$134_9$, which includes a respective pair of diodes 136 and 138.

As discussed below, the rectifier units $126_1$-$126_9$ cooperate to generate a DC voltage VDC on the common output node 130. For example, VDC may be one of the voltages $VDC_1$-$VDC_k$ of FIGS. 6 and 7, or may be $VDC_{intermediate}$ of FIG. 8.

Figure 10:
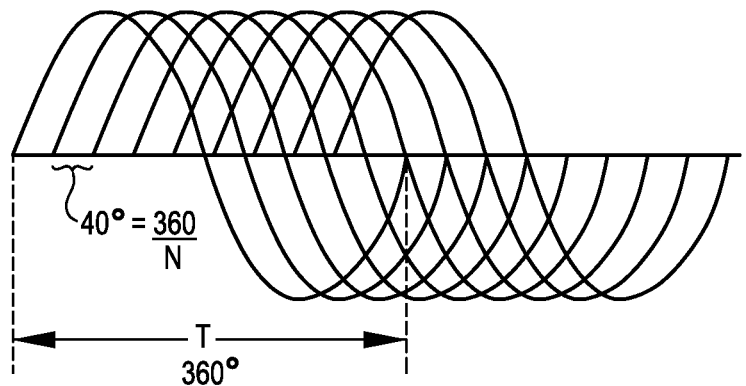
FIG. 10 is a plot of an example of the voltages generated by an embodiment of the coil assembly of FIG. 9.

FIG. 10 is a plot of the voltages generated by an embodiment of the coil assembly 102 of FIG. 9 at each of the taps 118, 120, and 122, where the total number N of taps equals nine.

Figure 11:
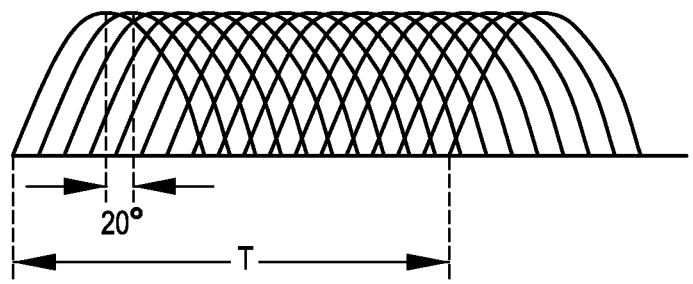
FIG. 11 is a plot of an example of the voltages effectively generated by an embodiment of the rectifier assembly of FIG. 9.

FIG. 11 is a plot of the effective rectified voltages generated from the tap voltages of FIG. 10 by an embodiment of the rectifier assembly 104 of FIG. 9.

Figure 12:
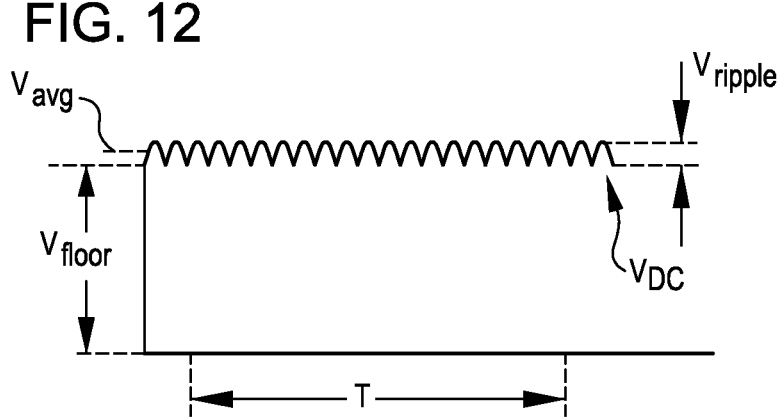
FIG. 12 is a plot of an example of the DC output voltage generated by an embodiment of the rectifier assembly of FIG. 9.

FIG. 12 is a plot of the voltage VDC generated by an embodiment of the rectifier assembly 104.

Figure 13:
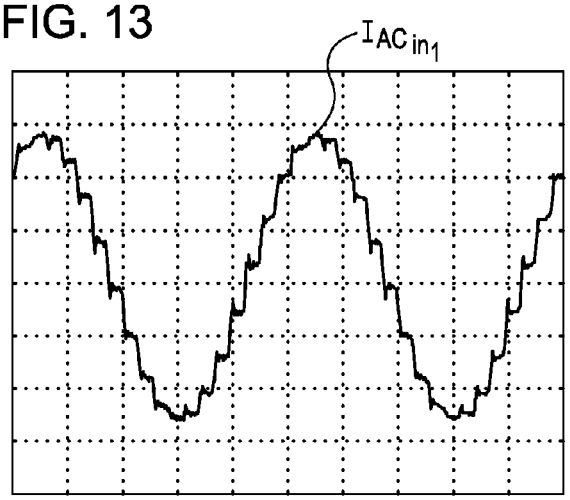
FIG. 13 is a plot of an example of the current waveform into an input node of an embodiment of the PFC power supply of FIG. 6.

FIG. 13 is a plot of one of the input-current components $IAC_{in1}$, $IAC_{in2}$, and $IAC_{in3}$ of FIG. 9, it being understood that the others of the components $IAC_{in1}$, $IAC_{in2}$, and $IAC_{in3}$ have approximately the same wave shape as, but are phase shifted relative to, the input-current component plotted in FIG. 13.

Referring to FIGS. 9-13, an example of the operation of an embodiment of the PFC substage 100 is described, where $VAC_{in}$ is a three-phase voltage having components $VAC_{in1}$, $VAC_{in2}$, and $VAC_{in3}$ separated from each other by approximately 120°.

Generally, the theory of operation of the PFC substage 100 is based on the phenomenon that the sum of two input sinusoids at the same frequency but with different phases equals a resulting sinusoid at the same frequency as, but with a different phase than, the two input sinusoids. This phenomenon is described by the following equation:

$$a \cdot \cos(\omega t + \theta_1) + b \cdot \cos(\omega t + \theta_2) = r \cdot \cos(\omega t + \theta_3) \quad (1)$$

where ω is the known angular frequency of all of the sinusoids, a and b are the known amplitudes and $\theta_1$ and $\theta_2$ are the known phases of the two input sinusoids, and r and $\theta_3$ are the amplitude and phase of the resulting sinusoid and are given by the following equations:

$$r = \sqrt{a^2 + b^2 + 2 \cdot a \cdot b \cdot \cos(\theta_1 - \theta_2)} \quad (2)$$

$$\theta_3 = \arctan(2 / a \cdot \cos\theta_1 + b \cdot \cos\theta_2]) \quad (3)$$

Referring to FIG. 9, the tapped coil 106 acts like a voltage divider, so that according to the circuit superposition theorem, the sinusoidal voltage at the tap $118_1$ equals the sum of the following two quantities: $VAC_{in1}$ times the coil 106 voltage divider at the tap $118_1$ seen from the node 112 with the node 114 grounded, and $VAC_{in2}$ times the coil 106 voltage divider at the tap $118_1$ seen from the node 114 with the node 112 grounded—it is noted that the nodes 112, 114, and 116 are not physically grounded, but are theoretically grounded only for purposes of the superposition theorem.

According to equations (1)-(3), even if the amplitudes of $VAC_{in1}$ and $VAC_{in2}$ are approximately the same, the voltage-dividing action of the coil 106 may cause the divided versions of these voltages to have different respective amplitudes at the tap $118_1$ such that the resulting sinusoidal voltage at this tap has the same frequency as, but has a different phase than (and typically a different amplitude than), either $VAC_{in1}$ or $VAC_{in2}$.

A similar analysis applies to the other taps $118_2$ and $118_3$ relative to $VAC_{in1}$ and $VAC_{in2}$, to the taps $120_1$-$120_3$ relative to $VAC_{in2}$ and $VAC_{in3}$, and to the taps $122_1$-$122_2$ relative to $VAC_{in1}$ and $VAC_{in3}$.

Furthermore, the locations of the taps $118_1$-$118_3$ along the coil 106, the locations of the taps $120_1$-$120_3$ along the coil 108, and the locations of the taps $122_1$-$122_3$ along the coil 110 may be selected so that the resulting sinusoidal voltages at each of these taps has approximately the same amplitude.

Alternatively, the coil segments 124 may be designed so that the resulting sinusoidal voltages at each of the taps $118_1$-$118_3$, $120_1$-$120_3$, and $122_1$-$122_3$ have approximately the same amplitude.

Or, the tap locations may be selected, and the coil segments 124 may be designed, so that the resulting sinusoidal voltages at each of the taps $118_1$-$118_3$, $120_1$-$120_3$, and $122_1$-$122_3$ have approximately the same amplitude.

Moreover, the tap locations may be selected or the coil segments 124 may be designed so that at least one of the resulting sinusoidal voltages at the taps $118_1$-$118_3$, $120_1$-$120_3$, and $122_1$-$122_3$ has a different amplitude than at least one other of these sinusoidal voltages.

Consequently, referring to FIG. 10, the coil assembly 102 of FIG. 9 collectively generates at its taps $118_1$-$118_3$, $120_1$-$120_3$, and $122_1$-$122_3$ N sinusoidal voltages at phase intervals of 360°/N, where N is also the total number of taps. In an embodiment described in conjunction with FIGS. 9-13, N=9 such that the coil assembly 102 generates nine sinusoidal voltages at approximately 40° phase intervals as plotted in FIG. 10.

Referring to FIG. 9, each rectifier unit $126_1$-$126_9$ of the rectifier assembly 104 full-wave rectifies a respective one of the sinusoidal voltages from the taps $118_1$-$118_3$, $120_1$-$120_3$, and $122_1$-$122_3$ of the coil assembly 102 such that the rectifier assembly effectively generates two positive half sinusoids for each sinusoidal voltage from the coil-unit taps. The peaks of adjacent ones of these positive half sinusoids are separated by a phase interval that is half the phase interval at which the sinusoidal voltages are generated. For example, referring to FIG. 11, in an embodiment where the coil assembly 102 generates N=9 sinusoidal voltages at approximately 40° intervals, the rectifier assembly 104 effectively generates 2·N=18 half sinusoids, where the peaks of these half sinusoids are at approximately 20° intervals. As discussed below, because, in an embodiment, the diodes 136 and 138 of the rectifier assembly 104 conduct only when the amplitude of a respective half sinusoid is greater than the floor of VDC (see the floor component of FIG. 11 with amplitude $VDC_{floor}$), the rectifier units 126 do not actually generate full half sinusoids (hence the term "effectively"), but generate only the peaks of these half sinusoids on the output node 130 as further discussed below. Furthermore, whenever a group of one or more of the forward diodes 136 is conducting a forward current, a group of one or more of the return diodes 138 is conducting a return current of approximately the same magnitude.

Referring to FIG. 12, in an embodiment, the net operational effect of the rectifier units 126 is that together, they generate the voltage VDC having a floor component of amplitude $V_{floor}$, a ripple component of amplitude $V_{ripple}$ and frequency 2·N/T, and an average component of magnitude $V_{avg}$. For example, in an embodiment of the PFC substage 100 of FIG. 9 where the number of taps N=9, $V_{ripple}$ has a frequency equal to eighteen times the frequency of the components $VAC_{in1}$, $VAC_{in2}$, and $VAC_{in3}$. Although not shown, one may smoothen the ripple component of VDC reduce the ripple component's amplitude $V_{ripple}$) by coupling a filter capacitor, or other filter, across the output nodes 130 and 132 of PFC substage 100. One effect of the 2N effective half sinusoids generated by the rectifier assembly 104 is that they spread out the current components $IAC_{in1}$, $IAC_{in2}$, and $IAC_{in3}$ over the respective periods of $VAC_{in1}$, $VAC_{in2}$, and $VAC_{in3}$ to improve the power factor of the power supply 60 of FIG. 6. For example, referring to FIG. 13, $IAC_{in1}$ is approximately sinusoidal and approximately in phase with $VAC_{in1}$ ($VAC_{in1}$ is not shown in FIG. 13). Although not shown, $IAC_{in2}$ has a wave shape similar to the wave shape of $IAC_{in1}$ and has a phase that is similar to the phase of $VAC_{in2}$, which means that the phase difference between $IAC_{in1}$ and $IAC_{in2}$ is similar to the phase difference between $VAC_{in1}$ and $VAC_{in2}$, i.e., is approximately 120°. Similarly, $IAC_{in3}$ has a wave shape similar to the wave shape of $IAC_{in1}$ and has a phase that is similar to the phase of $VAC_{in3}$, which means that the phase difference between $IAC_{in1}$ and $IAC_{in3}$ is similar to the phase difference between $VAC_{in1}$ and $VAC_{in3}$, i.e., is approximately 120°, and that the phase difference between $IAC_{in2}$ and $IAC_{in3}$ is similar to the phase difference between $VAC_{in2}$ and $VAC_{in3}$, i.e., is approximately 120°.

Figure 14:
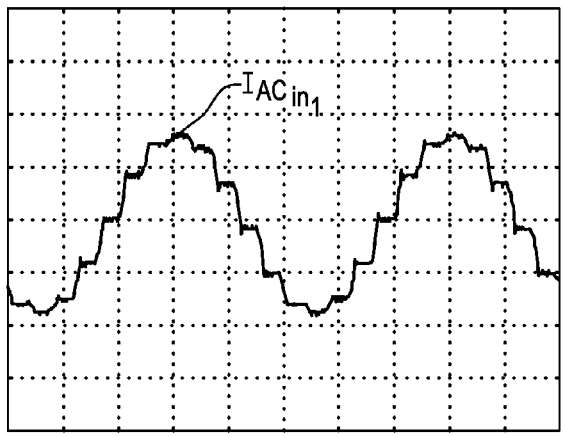
FIG. 14 is a plot of an example of the current waveform into an input node of another embodiment of the PFC power supply of FIG. 6.
Figure 15:
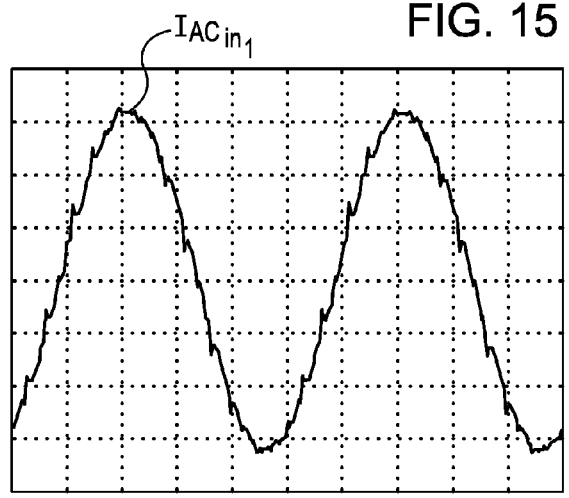
FIG. 15 is a plot of an example of the current waveform into an input node of still another embodiment of the PFC power supply of FIG. 6.

Referring to FIGS. 9, 13, and 14, by increasing the number of coil taps 118, 120, and 122, one may decrease the amplitude $V_{ripple}$ of VDC's ripple component (although the frequency of the ripple component may increase) and may further increase the power factor of the power supply 60 (FIG. 6) by causing the wave shapes and phases of $IAC_{in1}$, $IAC_{in2}$, and $IAC_{in3}$ to more closely approximate the wave shapes and phases of $VAC_{in1}$, $VAC_{in2}$, and $VAC_{in3}$, respectively. Conversely, by decreasing the number of coil taps 118, 120, and 122, one may increase the amplitude $V_{ripple}$ of VDC's ripple component (although the frequency of the ripple component may decrease) and may reduce the power factor of the power supply 60 by causing the wave shapes and phases of $IAC_{in1}$, $IAC_{in2}$, and $IAC_{in3}$ to less closely approximate the wave shapes and phases of $VAC_{in1}$, $VAC_{in2}$, and $VAC_{in3}$, respectively. For example, referring to FIG. 14, in an embodiment of the PFC substage 100 of FIG. 9 where N=6, one may see that $IAC_{in1}$ less closely resembles a sinusoid than does $IAC_{in1}$ of FIG. 13 for N=9 (a similar analysis applies for $IAC_{in2}$ and $IAC_{in3}$, which are phase-shifted versions of $IAC_{in1}$). In contrast, referring to FIG. 15, in an embodiment of the PFC substage 100 where N=15, one may see that $IAC_{in1}$ more closely resembles a sinusoid than does $IAC_{in1}$ of FIG. 13 for N=9 (a similar analysis applies for $IAC_{in2}$ and $IAC_{in3}$, which are phase-shifted versions of $IAC_{in1}$).

Referring to FIGS. 9-15, in summary, an embodiment of the PFC substage 100 passively (i.e., without any active components such as a transistor) imparts to an embodiment of the power supply 60 (FIG. 6) a level of power-factor correction that is selectable by varying the number N of coil taps 118, 120, and 122. Furthermore, if N is high enough, the amplitude $V_{ripple}$ of VDC's ripple component may be small enough so that no output filter capacitor, or other filtering, is needed; moreover, selecting N high enough may also reduce the amount of harmonic distortion introduced into $VAC_{in}$ to a level that allows one to omit a distortion filter from the power supply 60. The ability to omit one or more filters may reduce the size of the PFC substage 100 and/or the power supply 60, and may also reduce the costs for manufacturing and installing the PFC substage and/or power supply.

Referring to FIG. 9, alternate embodiments of the PFC substage 100 are contemplated. For example, instead of coupling a DC-to-DC-converter substage 92 (FIG. 8) to the output node 130 of the PFC substage 100 to convert VDC into another DC voltage level, one may modify the PFC substage to adjust VDC to a suitable level. For instance, the coil assembly 102 may be the secondary side of a transformer, where the turn ratio between the primary and secondary sides is selected so that VDC has a desired level. Furthermore, the coil assembly 102 may be configured to operate with $VAC_{in}$ having more or fewer than three phases. For example, where $VAC_{in}$ includes only two phases, the coil assembly 102 may include only one of the coils 106, 108, and 110 and a corresponding pair of the nodes 112, 114, and 116. Moreover, the PFC substage 100 may include any suitable type of passive or active PFC circuitry and any suitable type of rectifying circuitry in addition to, or instead of, embodiments of the PFC and rectifying circuitry described above. In addition, although the number N of coil taps 118, 120, and 122 is described as equaling nine, N may equal any other suitable number.

Figure 16A:
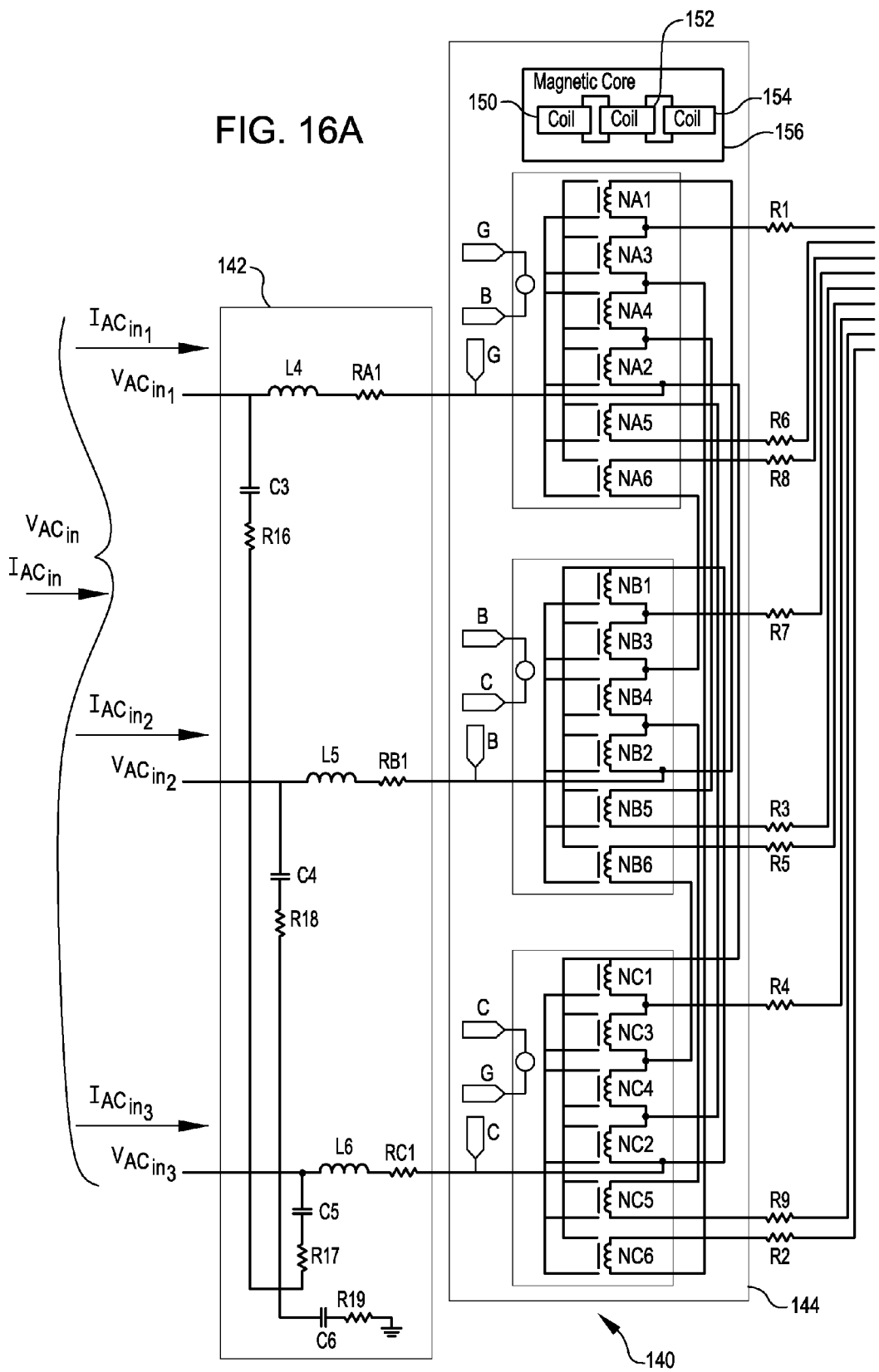
FIGS. 16A and 16B are a schematic diagram of an embodiment of a PFC substage that may be included in the PFC-and-DC-to-DC-converter stage of FIG. 6.
Figure 16B:
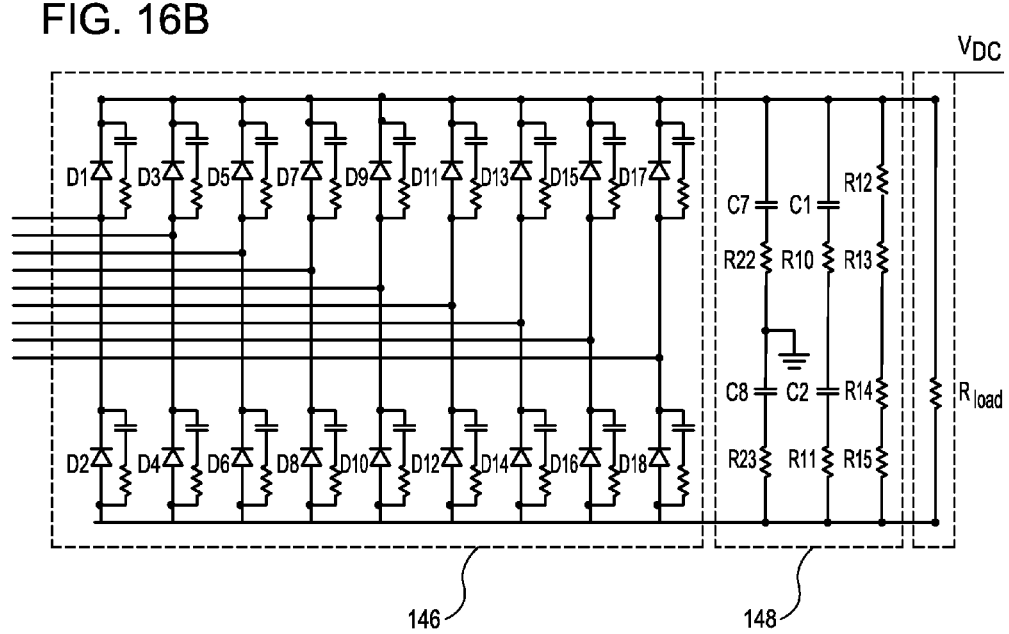

FIGS. 16A and 16B are a schematic diagram of an embodiment of a PFC substage 140, which may be used as, or included as part of, one or more of the PFC substages 80 and 90 of FIGS. 7 and 8. In the described embodiment, the PFC substage 140 is designed for $VAC_{in}$ being a three-phase voltage having three phases/components $VAC_{in1}$, $VAC_{in2}$, and $VAC_{in3}$, for example three 220 VAC components separated from each other by 120°.

The PFC substage 140 includes an input filter 142, a coil assembly 144, a rectifier assembly 146, and an output filter 148.

The input filter 142 filters $VAC_{in1}$, $VAC_{in2}$, and $VAC_{in3}$.

The coil assembly 144 includes coils 150, 152, and 154 wrapped around respective rungs of a core 156, includes N=9 coil taps, and operates in a manner similar to the coil assembly 102 of FIG. 9.

The rectifier assembly 146 is similar to the rectifier assembly 104 of FIG. 9 in structure and operation.

The output filter 148 generates VDC by filtering the intermediate voltage from the rectifier assembly 146.

Alternate embodiments of the PFC stage 140 are contemplated. For example, one or more of the alternate embodiments described above in conjunction with the PFC substage 100 of FIG. 9 may be applicable to the PFC stage 140.

Figure 17:
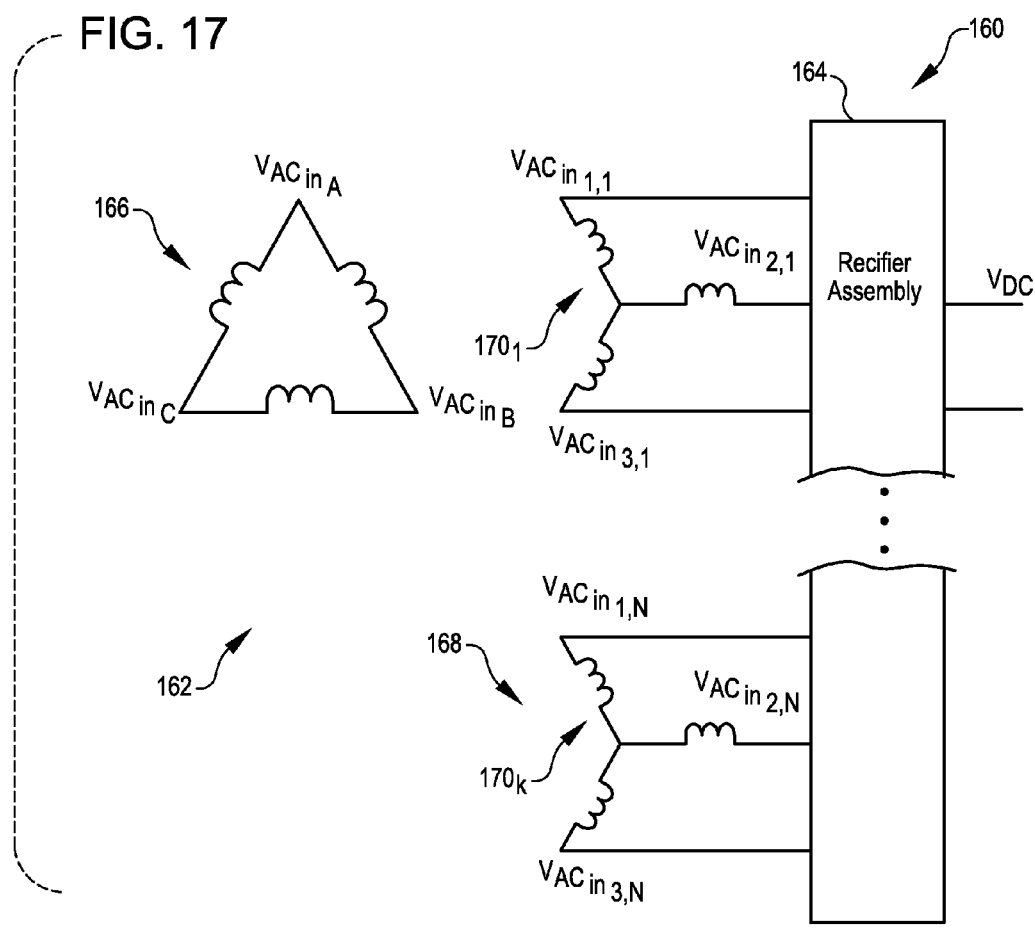
FIG. 17 is a schematic diagram of another embodiment of a PFC substage that may be included in the PFC-and-DC-to-DC-converter stage of FIG. 6.

FIG. 17 is a schematic diagram of an embodiment of a PFC substage 160, which may be used as, or included as part of, one or more of the PFC substages 80 and 90 of FIGS. 7 and 8. In the described embodiment, the PFC substage 160 is designed for $VAC_{in}$ being a three-phase voltage having three phases/components $VAC_{in1}$, $VAC_{in2}$, and $VAC_{in3}$, for example three 220 VAC components separated from each other by 120°

The PFC substage 160 includes a transformer 162 and a rectifier assembly 164.

The transformer 162 is arranged in a delta/delta/double-polygon configuration, and includes a primary coil assembly 166 that is magnetically coupled to a secondary coil assembly 168, which includes m coil subassemblies $170_1$-$170_m$ each having three respective coils, where m 1. In operation, the primary coil assembly 166 receives $VAC_{in1}$-$VAC_{in3}$ from a main power source such as the power-company power lines, and the magnetic-coupling action between the primary and secondary coil assemblies causes $VAC_{in1,1}$, $VAC_{in2,1}$, $VAC_{in3,1}$-$VAC_{in1,m}$, $VAC_{in2,m}$, $VAC_{in3,m}$ to be generated on the respective nodes of each coil subassembly $170_1$-$170_m$ such that the secondary coil assembly 168 includes $3 \cdot m = N$ coil taps.

The rectifier assembly 164 may be similar to the rectifier assembly 104 of FIG. 9 and generates VDC from the coil-tap voltages generated by the secondary coil assembly 168.

Alternate embodiments of the PFC stage 160 are contemplated. For example, one or more of the alternate embodiments described above in conjunction with the PFC substages 100 and 140 of FIGS. 9 and 16 may be applicable to the PFC stage 160.

Figure 18:
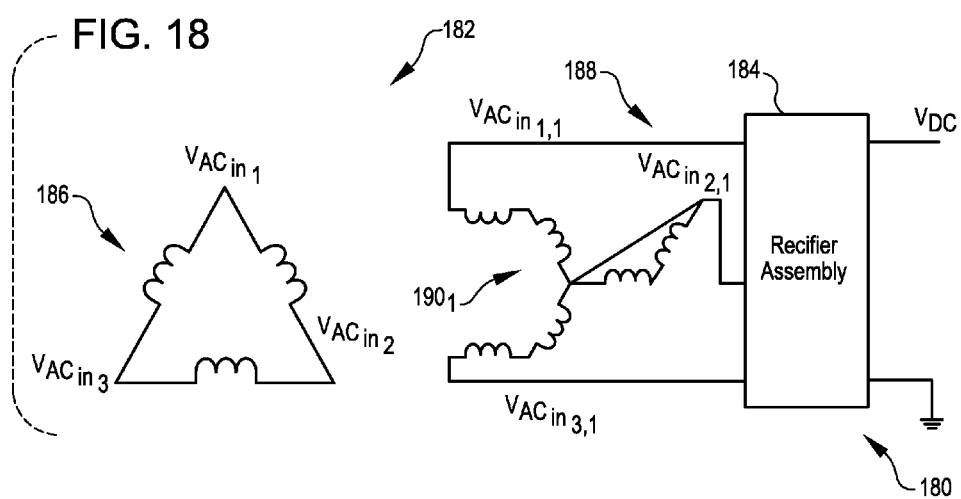
FIG. 18 is a schematic diagram of another embodiment of a PFC substage that may be included in the PFC-and-DC-to-DC-converter stage of FIG. 6.

FIG. 18 is a schematic diagram of an embodiment of a PFC substage 180, which may be used as, or included as part of, one or more of the PFC substages 80 and 90 of FIGS. 7 and 8. In the described embodiment, the PFC substage 180 is designed for $VAC_{in}$ being a three-phase voltage having three phases/components $VAC_{in1}$, $VAC_{in2}$, and $VAC_{in3}$, for example three 220 VAC components separated from each other by 120°

The PFC substage 180 includes a transformer 182 and a rectifier assembly 184.

The transformer 182 is arranged in a delta/zig-zag configuration, and includes a primary coil assembly 186 that is magnetically coupled to a secondary coil assembly 188, which includes m coil subassemblies $190_1$-$190_m$ (only the subassembly $190_1$ shown in FIG. 18) each having three respective coils, where m 1. In operation, the primary coil assembly 186 receives $VAC_{in1}$-$VAC_{in3}$ from a main power source such as the power-company power lines, and the coupling action between the primary and secondary coil assemblies causes $VAC_{in1,1}$, $VAC_{in2,1}$, $VAC_{in3,1}$-$VAC_{in1,m}$, $VAC_{in2,m}$, $VAC_{in3,m}$ to be generated on the respective nodes of each coil subassembly $190_1$-$190_m$ such that the secondary coil assembly includes $3 \cdot m = N$ coil taps.

The rectifier assembly 184 may be similar to the rectifier assembly 104 of FIG. 9 and generates VDC from the coil-tap voltages generated by the secondary coil assembly 188.

Alternate embodiments of the PFC stage 180 are contemplated. For example, one or more of the alternate embodiments described above in conjunction with the PFC substages 100, 140, and 160 of FIGS. 9, 16, and 17 may be applicable to the PFC stage 180.

Figure 19:
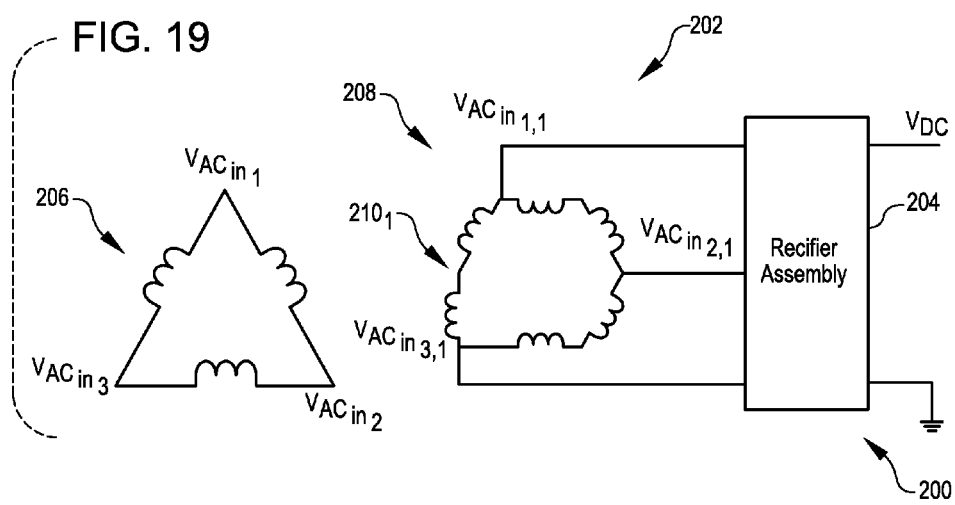
FIG. 19 is a schematic diagram of yet another embodiment of a PFC substage that may be included in the PFC-and-DC-to-DC-converter stage of FIG. 6.

FIG. 19 is a schematic diagram of an embodiment of a PFC substage 200, which may be used as, or included as part of, one or more of the PFC substages 80 and 90 of FIGS. 7 and 8. In the described embodiment, the PFC substage 200 is designed for VAC being a three-phase voltage having three phases/components $VAC_{in1}$, $VAC_{in2}$, and $VAC_{in3}$, for example three 220 VAC components separated from each other by 120°

The PFC substage 200 includes a transformer 202 and a rectifier assembly 204.

The transformer 202 is arranged in a delta/polygon configuration, and includes a primary coil assembly 206 that is magnetically coupled to a secondary coil assembly 208, which includes m coil subassemblies $210_1$-$210_m$ (only the subassembly $210_1$ shown in FIG. 19) each having three respective coils, where m≥1. In operation, the primary coil assembly 206 receives $VAC_{in1}$-$VAC_{in3}$ from a main power source such as the power-company power lines, and the magnetic-coupling action between the primary and secondary coil assemblies causes $VAC_{in1,1}$, $VAC_{in2,1}$, $VAC_{in3,1}$-$VAC_{in1,m}$, $VAC_{in2,m}$, $VAC_{in3,m}$ to be generated on the respective nodes of each coil subassembly $210_1$-$210_m$ such that the secondary coil assembly includes $3 \cdot m = N$ coil taps.

The rectifier assembly 204 may be similar to the rectifier assembly 104 of FIG. 9 and generates VDC from the coil-tap voltages generated by the secondary coil assembly 208.

Alternate embodiments of the PFC stage 200 are contemplated. For example, one or more of the alternate embodiments described above in conjunction with the PFC substages 100, 140, 160, and 180 of FIGS. 9, 16, 17, and 18 may be applicable to the PFC stage 200.

FIG. 20 is a schematic diagram of an embodiment of a PFC substage 220, which may be used as, or included as part of, one or more of the PFC substages 80 and 90 of FIGS. 7 and 8. In the described embodiment, the PFC substage 220 includes N=9 taps and is designed for $VAC_{in}$ being a three-phase voltage having three phases/components $VAC_{in1}$, $VAC_{in2}$, and $VAC_{in3}$, for example three 220 VAC components separated from each other by 120°.

The PFC substage 220 includes a transformer 222 and a rectifier assembly 224.

The transformer 222 is arranged in a delta/delta/double-polygon configuration, and includes a primary coil assembly 226 that is magnetically coupled to a secondary coil assembly 228, which includes m=3 coil subassemblies $230_1$-$230_3$ each having three respective coils and having relative phases +20°, 0°, and −20° node to node. For example, the phase of $VAC_{in3,2}$ lags the phase of $VAC_{in3,1}$ by 20°, and leads the phase of $VAC_{in3,3}$ by 20°. In operation, the primary coil assembly 226 receives $VAC_{in1}$-$VAC_{in3}$ from a main power source such as the power-company power lines, and the magnetic-coupling action between the primary and secondary coil assemblies causes $VAC_{in1,1}$, $VAC_{in2,1}$, $VAC_{in3,1}$-$VAC_{in1,3}$, $VAC_{in2,3}$, $VAC_{in3,3}$ to be generated on the respective nodes of each coil subassembly $230_1$-$230_3$ such that the secondary coil assembly includes $3 \cdot (m=3) = N = 9$ coil taps.

The rectifier assembly 224 may be similar to the rectifier assembly 104 of FIG. 9 and generates VDC from the coil-tap voltages generated by the secondary coil assembly 228.

Alternate embodiments of the PFC stage 220 are contemplated. For example, one or more of the alternate embodiments described above in conjunction with the PFC substages 100, 140, 160, 180, and 200 of FIGS. 9, 16, 17, 18, and 19 may be applicable to the PFC stage 220.

From the foregoing it will be appreciated that, although specific embodiments have been described herein for purposes of illustration, various modifications may be made without deviating from the spirit and scope of the disclosure.

Furthermore, where an alternative is disclosed for a particular embodiment, this alternative may also apply to other embodiments even if not specifically stated.

What is claimed is:

1. A power supply, comprising:
a first input node configured to receive a first input AC signal having a first phase and having peak portions and non-peak portions;
a second input node configured to receive a second input AC signal having a second phase and having peak and non-peak portions, the second phase being different from the first phase;
a third input node configured to receive a third input AC signal having a third phase and having peak and non-peak portions, the third phase being different from the first and second phases;
a converter stage including a transformer, coupled to the first, second, and third input nodes, and configured to generate a first DC power signal from the first, second, and third input AC signals, to galvanically isolate the first DC power signal from the first, second, and third input nodes, and to perform power-factor correction by causing a first current to be drawn from the first input node during the peak and the non-peak portions of the first input AC signal, a second current to be drawn from the second input node during the peak and the non-peak portions of the second AC signal, and a third current to be drawn from the third input node during the peak and non-peak portions of the third AC signal; and a first output node coupled to the converter stage and configured to carry the first DC power signal.

2. The power supply of claim 1 wherein the first, second, and third input AC signals respectively include first, second, and third AC voltages.

3. The power supply of claim 1 wherein the first DC power signal includes a first DC voltage.

4. The power supply of claim 1 wherein the transformer forms at least part of a power-factor-corrector substage configured to convert the first, second, and third input AC signals into the first DC signal.

5. The power supply of claim 1 wherein:
the converter stage is configured to generate a second DC power signal from the first, second, and third input AC signals;
the transformer forms at least part of a first power-factor-corrector substage configured to convert the first, second, and third input AC signals into the first DC power signal; and
the transformer forms at least part of a second power-factor-corrector substage configured to convert the first, second, and third input AC signals into the second DC power signal.

6. The power supply of claim 1 wherein:
the transformer forms at least part of a power-factor-corrector substage configured to convert the first, second, and third input AC signals into an intermediate DC signal; and
the converter stage includes a converter substage configured to convert the intermediate DC signal into the first DC power signal.

7. The power supply of claim 1 wherein:
the converter stage is configured to generate a second DC power signal from the first, second, and third input AC signals;
the transformer forms at least part of a power-factor-corrector substage configured to convert the first, second, and third input AC signals into an intermediate DC signal;
the converter stage includes a first converter substage configured to convert the intermediate DC signal into the first DC power signal; and
the converter stage includes a second converter substage configured to convert the intermediate DC signal into the second DC power signal.

8. The power supply of claim 1 wherein:
the transformer includes a coil having a first end node coupled to the first input node, a second end node coupled to the second input node, a third end node coupled to the third input node, and having tap nodes; and
the converter stage includes a rectifier having rectifier input nodes respectively coupled to the tap nodes and having a rectifier output node configured to provide the first DC power signal.

9. The power supply of claim 1 wherein:
the transformer includes
a first coil having a first end node coupled to the first input node, a second end node coupled to the second input node, and first tap nodes,
a second coil having a first end coupled to the first input node, a second end coupled to the third input node, and second tap nodes, and
a third coil having a first end coupled to the second input node, a second end coupled to the third input node, and third tap nodes; and
the converter stage includes a rectifier having rectifier input nodes respectively coupled to the first, second, and third tap nodes and having a rectifier output node configured to provide the first DC power signal.

10. The power supply of claim 1, further including:
a reference node;
wherein the transformer includes
a first coil having a first end node coupled to the first input node, having a second end coupled to the reference node, and having first tap nodes,
a second coil having a first end coupled to the second input node, a second end coupled to the reference node, and second tap nodes, and
a third coil having a first end coupled to the third input node, a second end coupled to the reference node, and third tap nodes; and
wherein the converter stage includes a rectifier having rectifier input nodes respectively coupled to the first, second, and third tap nodes and having a rectifier output node configured to provide the first DC power signal.

11. The power supply of claim 1, further including a wiring panel configured to couple the first DC power signal from the converter stage to the first output node.

12. The power supply of claim 1, further including:
a second output node coupled to the first input node and configured to carry the first input AC signal;
a third output node coupled to the second input node and configured to carry the second input AC signal; and
a fourth output node coupled to the third input node and configured to carry the third input AC signal.

13. The power supply of claim 1, further including:
second, third, and fourth output nodes; and
a wiring panel configured to couple the first input AC signal from the first input node to the second output node, the second input AC signal from the second input node to the third output node, and the third input AC signal from the third input node to the fourth output node.

14. The power supply of claim 1, further including:
a first wiring panel configured to couple the first DC power signal from the converter stage to the first output node;
second, third, and fourth output nodes; and
a second wiring panel configured to couple the first input AC signal from the first input node to the second output node, the second input AC signal from the second input node to the third output node, and the third input AC signal from the third input node to the fourth output node.

15. A facility, comprising:
a first input node configured to receive a first input AC signal having a first phase and having peak portions and non-peak portions;
a second input node configured to receive a second input AC signal having a second phase and having peak and non-peak portions, the second phase being different from the first phase;

a third input node configured to receive a third input AC signal having a third phase and having peak and non-peak portions, the third phase being different from the first and second phases;

a first power distribution line;

a converter stage coupled to the input node and to the first power distribution line, including a transformer, and configured to isolate electrically the first power distribution line from the first, second, and third input nodes, to generate from the first, second, and third input AC signals a first DC power signal on the distribution line, and to cause a first current to be drawn from the first input node during the peak and the non-peak portions of the first input AC signal, a second current to be drawn from the second input node during the peak and the non-peak portions of the second input AC signal, and a third current to be drawn from the third input node during the peak and the non-peak portions of the third input AC signal; and a load coupled to the first power distribution line.

16. The facility of claim 15, further including:
wherein the load includes a plug-in apparatus; and
a first receptacle coupled to the first distribution line and configured to couple the first DC power signal to the plug-in apparatus.

17. The facility of claim 15 wherein:
the first, second, and third input AC signals respectively include first, second, and third input AC voltages; and
the first DC power signal includes a first DC voltage.

18. The facility of claim 15 wherein the transformer forms at least a portion of a power-factor-corrector substage configured to convert the first, second, and third input AC signals into the first DC power signal.

19. The facility of claim 15 wherein:
the converter stage is configured to generate a second DC power signal from the first, second, and third input AC signals;
the transformer forms at least a portion of a first power-factor-corrector substage configured to convert the first, second, and third input AC signals into the first DC power signal; and
the transformer forms at least a portion of a second power-factor-corrector substage configured to convert the first, second, and third input AC signals into the second DC power signal.

20. The facility of claim 15 wherein:
the transformer forms at least a portion of a power-factor-corrector substage configured to convert the first, second, and third input AC signals into an intermediate DC signal; and
the converter stage includes a converter substage configured to convert the intermediate DC signal into the first DC power signal.

21. The facility of claim 15 wherein:
the converter stage is configured to generate a second DC power signal from the first, second, and third input AC signals;
the transformer forms at least a portion of a power-factor-corrector substage configured to convert the first, second, and third input AC single into an intermediate DC signal; and
the converter stage includes
a first converter substage configured to convert the intermediate DC signal into the first DC power signal, and
a second converter substage configured to convert the intermediate DC signal into the second DC power signal.

22. The facility of claim 15, further including a breaker panel configured to couple the first DC power signal from the converter stage to the first distribution line.

23. The facility of claim 15, further including second, third, and fourth distribution lines respectively coupled to the first, second, and third input nodes and configured to carry the first, second, and third input AC signals.

24. The facility of claim 15, further including:
second, third, and fourth distribution lines; and
a wiring panel configured to couple the first, second, and third input AC signals from the first, second, and third input nodes to the second, third, and fourth distribution lines, respectively.

25. The facility of claim 15, further including:
a first wiring panel configured to couple the first DC power signal from the converter stage to the first distribution line;
second, third, and fourth distribution lines; and
a second wiring panel configured to couple the first, second, and third input AC signals from the first, second, and third input nodes to the second, third, and fourth distribution lines, respectively.

26. A system, comprising:
a facility;
a first input node configured to receive a first input AC signal having a first phase and having peak portions and non-peak portions;
a second input node configured to receive a second input AC signal having a second phase and having peak and non-peak portions, the second phase being different from the first phase;
a third input node configured to receive a third input AC signal having a third phase and having peak and non-peak portions, the third phase being different from the first and second phases;
a first power distribution line disposed in the facility;
a converter stage coupled to the first, second, and third input nodes and to the first power distribution line, including a transformer, and configured
to isolate the first, second, and third input nodes from the first power distribution line,
to generate from the first, second, and third input AC signals a first DC power signal on the distribution line, and
to effect power-factor correction by causing a first current to be drawn from the first input node during the peak and the non-peak portions of the first input AC signal, a second current to be drawn from the second input node during the peak and the non-peak portions of the second input AC signal, and a third current to be drawn from the third input node during the peak and the non-peak portions of the third input AC signal; and
an apparatus coupled to the first power distribution line.

27. The system of claim 26 wherein the facility includes a building.

28. The system of claim 26 wherein the facility includes a residence.

29. The system of claim 26 wherein the facility includes a manufacturing plant.

30. The system of claim 26 wherein the facility includes a site.

31. A method, comprising:
  receiving on a first input node a first input AC signal having a first phase and having peak portions and non-peak portions;
  receiving on a second input node a second input AC signal having a second phase and having peak and non-peak portions, the second phase being different from the first phase;
  receiving on a third input node a third input AC signal having a third phase and having peak and non-peak portions, the third phase being different from the first and second phases;
  generating a first DC power signal at a first power output node by using a transformer to effect power-factor correction by causing a first current to be drawn from the first input node during the peak and the non-peak portions of the first input AC signal, a second current to be drawn from the second input node during the peak and the non-peak portions of the second input AC signal, and a third current to be drawn from the third input node during the peak and the non-peak portions of the third input AC signal;
  galvanically isolating the first power output node from the first, second, and third input nodes using the transformer; and
  powering a load coupled to the first power output node with the DC power signal.

32. The method of claim 31 wherein:
  the first input AC signal includes a first input AC voltage; and
  the first DC power signal includes a first DC voltage.

33. The method of claim 31, further including generating a second power-factor-corrected DC power signal at a second power output node by causing the first current to be drawn from the first input node during the non-peak portions of the first input AC signal, the second current to be drawn from the second input node during the non-peak portions of the second input AC signal, and the third current to be drawn from the third input node during the non-peak portions of the third input AC signal.

34. The method of claim 31 wherein generating the first DC power signal includes:
  generating an intermediate DC signal by causing the first current to be drawn from the first input node during the peak and the non-peak portions of the first input AC signal, the second current to be drawn from the second input node during the peak and the non-peak portions of the second input AC signal, and the third current to be drawn from the third input node during the peak and the non-peak portions of the third input AC signal; and
  converting the intermediate DC signal into the first DC power signal.

35. The method of claim 31 wherein generating the first DC power signal includes:
  generating an intermediate DC signal by causing the first current to be drawn from the first input node during the peak and the non-peak portions of the first input AC signal, the second current to be drawn from the second input node during the peak and the non-peak portions of the second input AC signal, and the third current to be drawn from the third input node during the peak and the non-peak portions of the third input AC signal;
  converting the intermediate DC signal into the first DC power signal; and
  converting the intermediate DC signal into a second DC power signal on a second power output node.

36. The method of claim 31 wherein generating the first DC power signal includes rectifying signals tapped from a coil having an end coupled to the first input node.

37. The method of claim 31 wherein generating the first DC power signal includes rectifying signals tapped from first, second, and third coils, the first coil having end nodes respectively coupled to the first and second input nodes, the second coil having end nodes respectively coupled to the first and third input nodes, and the third coil having end nodes respectively coupled to the second and third input nodes.

38. The method of claim 31 wherein generating the first DC power signal includes rectifying signals tapped from first, second, and third coils, the first coil having end nodes respectively coupled to the first input node and a reference node, the second coil having end nodes respectively coupled to the second input node and the reference node, and the third coil having end nodes respectively coupled to the third input node and the reference node.

39. A method, comprising:
  coupling first, second, and third facility input nodes for a facility to first, second, and third converter input nodes of a converter stage that includes a transformer, the first facility input node configured to receive a first input AC signal having a first phase and peak portions and non-peak portions, the second facility input node configured to receive a second input AC signal having a second phase that is different from the first phase and having peak portions and non-peak portions, the third facility input node configured to receive a third input AC signal having a third phase that is different from the first and second phases and having peak portions and non-peak portions, the converter stage configured to generate, on a first converter output node, a first DC power signal from the first, second, and third input AC signals, to isolate the first converter output node from the first, second, and third facility input nodes, and to use the transformer to perform power-factor correction by causing a first current to be drawn from the first facility input node during the peak and the non-peak portions of the first input AC signal, a second current to be drawn from the second facility input node during the peak and the non-peak portions of the second input AC signal, and a third current to be drawn from the third facility input node during the peak and the non-peak portions of the third input AC signal; and
  coupling a first power output node for the facility to the first converter output node of the converter stage.

40. The method of claim 39, further including installing the first power output node in the facility before coupling the first power output node to the first converter output node of the converter stage.

41. The method of claim 39, further including uncoupling the first power output node from a signal source other than the converter stage before coupling the first power output node to the first converter output node of the converter stage.

42. The method of claim 39 wherein:
  the first input AC signal includes a first input AC voltage;
  the second input AC signal includes a second input AC voltage;
  the third input AC signal includes a third input AC voltage; and
  the first DC power signal includes a first DC voltage.

43. The method of claim 39 wherein the converter stage includes a power-factor-corrector substage that includes at least a portion of the transformer, the substage configured to convert the first, second, and third input AC signals into the first DC signal.

44. The method of claim 39 wherein:

the converter stage is configured to generate a second DC power signal from the first, second, and third input AC signals;

the transformer forms at least a portion of a first power-factor-corrector substage configured to convert the first, second, and third input AC signals into the first DC power signal; and the transformer forms at least a portion of a second power-factor-corrector substage configured to convert the first, second, and third input AC signals into the second DC power signal.

45. The method of claim 39 wherein:

the transformer forms at least a portion of a power-factor-corrector substage configured to convert the first, second, and third input AC signals into an intermediate DC signal; and the converter stage includes a converter substage configured to convert the intermediate DC signal into the first DC power signal.

46. The method of claim 39 wherein:

the converter stage is configured to generate a second DC power signal from the first, second, and third input AC signals;

the transformer forms at least a portion of a power-factor-corrector substage configured to convert the first, second, and third input AC signals into an intermediate DC signal;

the converter stage includes a first converter substage configured to convert the intermediate DC signal into the first DC power signal; and the converter stage includes a second converter substage configured to convert the intermediate DC signal into the second DC power signal.

47. The method of claim 39 wherein:

the transformer includes a first coil having an end node coupled to the first converter input node and having tap nodes, a second coil having an end node coupled to the second converter input node and having tap nodes, and a third coil coupled to the third converter input node and having tap nodes; and a rectifier having rectifier input nodes respectively coupled to the tap nodes and having a rectifier output node coupled to the first converter output node.

48. The method of claim 39 wherein:

the transformer includes
 a first coil having a first end node coupled to the first converter input node, a second end node coupled to the second converter input node, and first tap nodes,
 a second coil having a first end coupled to the first converter input node, a second end coupled to the third converter input node, and second tap nodes, and
 a third coil having a first end coupled to the second converter input node, a second end coupled to the third converter input node, and third tap nodes, and wherein the converter stage includes a rectifier having rectifier input nodes respectively coupled to the first, second, and third tap nodes and having a rectifier output node coupled to the first converter output node.

49. The method of claim 39, further including:

coupling a facility reference node for the facility to a converter reference node for the converter stage;

wherein the transformer includes
 a first coil having a first end node coupled to the first converter input node, having a second end coupled to the converter reference node, and having first tap nodes,
 a second coil having a first end coupled to the second converter input node, a second end coupled to the converter reference node, and second tap nodes, and
 a third coil having a first end coupled to the third converter input node, a second end coupled to the converter reference node, and third tap nodes, and wherein the converter stage includes a rectifier having rectifier input nodes respectively coupled to the first, second, and third tap nodes and having a rectifier output node coupled to the first converter output node.

50. The method of claim 39, further including:

installing a wiring panel for the facility; and coupling the first converter output node to the first power output node via the wiring panel.

51. The method of claim 39, further including coupling the first converter output node to the first power output node via a wiring panel.

52. The method of claim 39, further including coupling a second power output node to the first facility input node, a third power output node to the second facility input node, and a fourth power output node to the third facility input node.

53. The method of claim 39, further including coupling a second power output node to the first facility input node via a wiring panel, a third power output node of the facility to the second facility input node via the wiring panel, and a fourth power output node of the facility to the third facility input node via the wiring panel.

54. The method of claim 39, further including:

coupling the first DC power signal to the first power output node via a first wiring panel; and coupling the first input AC signal to a second power output node of the facility via a second wiring panel, the second input AC signal to a third power output node of the facility via the second wiring panel, and the third input AC signal to a fourth power output node of the facility via the second wiring panel.

55. The method of claim 54, further including installing one of the first and second wiring panels.

56. The power supply of claim 1 wherein the first output node includes a first outlet.

57. The power supply of claim 1 wherein the first output node includes a first receptacle.

58. The facility of claim 15 wherein the load lacks a power supply.

59. The facility of claim 15 wherein the load lacks a power-factor corrector.

60. The facility of claim 15 wherein the load includes at least one light fixture.

61. The system of claim 26 wherein the apparatus lacks a power supply.

62. The system of claim 26 wherein the apparatus lacks a power-factor corrector.

63. The system of claim 26 wherein the apparatus includes at least one lighting apparatus.

64. The method of claim 39, further including coupling a load to the first power output node for the facility.

65. The method of claim 64 wherein the load includes at least one lighting fixture.

66. The method of claim 64 wherein the load lacks a power supply.

67. The method of claim 64 wherein the load lacks a power-factor corrector.

* * * * *